United States Patent
Tsunekawa

(10) Patent No.: US 8,804,648 B2
(45) Date of Patent: Aug. 12, 2014

(54) WIRELESS COMMUNICATION SYSTEM, BASE STATION APPARATUS, MOBILE STATION APPARATUS, COMMUNICATION CONTROL METHOD, AND COMMUNICATION CONTROL PROGRAM

(75) Inventor: Koichi Tsunekawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 100 days.

(21) Appl. No.: 13/521,201

(22) PCT Filed: Jan. 12, 2011

(86) PCT No.: PCT/JP2011/050362
§ 371 (c)(1),
(2), (4) Date: Jul. 9, 2012

(87) PCT Pub. No.: WO2011/087022
PCT Pub. Date: Jul. 21, 2011

(65) Prior Publication Data
US 2012/0281602 A1    Nov. 8, 2012

(30) Foreign Application Priority Data
Jan. 12, 2010    (JP) ................ P2010-004132

(51) Int. Cl.
H04W 4/00    (2009.01)
H04W 72/08    (2009.01)
(52) U.S. Cl.
CPC ................... *H04W 72/085* (2013.01)
USPC ....................................................... 370/329
(58) Field of Classification Search
USPC ............... 370/229, 230, 329–332; 455/435.1, 455/435.2, 436, 444, 449
See application file for complete search history.

(56) References Cited

U.S. PATENT DOCUMENTS 6,477,367 B1 * 11/2002 Kim .............................. 455/423
2010/0027510 A1 * 2/2010 Balasubramanian et al. 370/332

FOREIGN PATENT DOCUMENTS

| EP | 1096730 A1 | 5/2001 |
| JP | 2000-22712 A | 1/2000 |
| JP | 2009-267815 A | 11/2009 |

OTHER PUBLICATIONS

3rd Generation Partnership Project, Technical Specification Group Services and System Aspects, "Service requirements for Home NodeBs and Home eNodeBs", 3GPP TS 22.220, V9.1.1, Jun. 2009, pp. 1-22.

(Continued)

*Primary Examiner* — Kerri Rose
(74) *Attorney, Agent, or Firm* — Birch, Stewart, Kolasch & Birch, LLP

(57) ABSTRACT

A mobile station apparatus can stably communicate with a base station apparatus even when interference occurs due to a signal from another apparatus in a part of a frequency band used for communication. A second base station apparatus communicates with the mobile station apparatus using a common frequency band, which is all or part of a frequency band to be used for communication by the first base station apparatus, and a dedicated frequency band to be unused by the first base station apparatus. A communication band selection unit a256 of the second base station apparatus selects the common frequency band as a frequency band to be used for communication with the mobile station apparatus in case that radio quality of the common frequency band in the mobile station apparatus is greater than a predetermined threshold value, and selects the dedicated frequency band as the frequency band to be used for the communication with the mobile station apparatus in case that the radio quality of the common frequency band in the mobile station apparatus is less than the predetermined threshold value.

24 Claims, 15 Drawing Sheets

(56) References Cited

OTHER PUBLICATIONS

3rd Generation Partnership Project, Technical Specification Group Radio Access Network, "Further Advancements for E-UTRA Physical Layer Aspects", (Release 9), 3GPP TR 36.814, V0.4.1, Feb. 2009, pp. 1-31.

NTT DOCOMO. "Views on Component Carrier Types for Carrier Aggregations in LTE-Advanced", 3GPP TSG RAN WG1 Meeting #58, R1-093507, Shenzhen, China, Aug. 24-28, 2009, pp. 1-5.

* cited by examiner

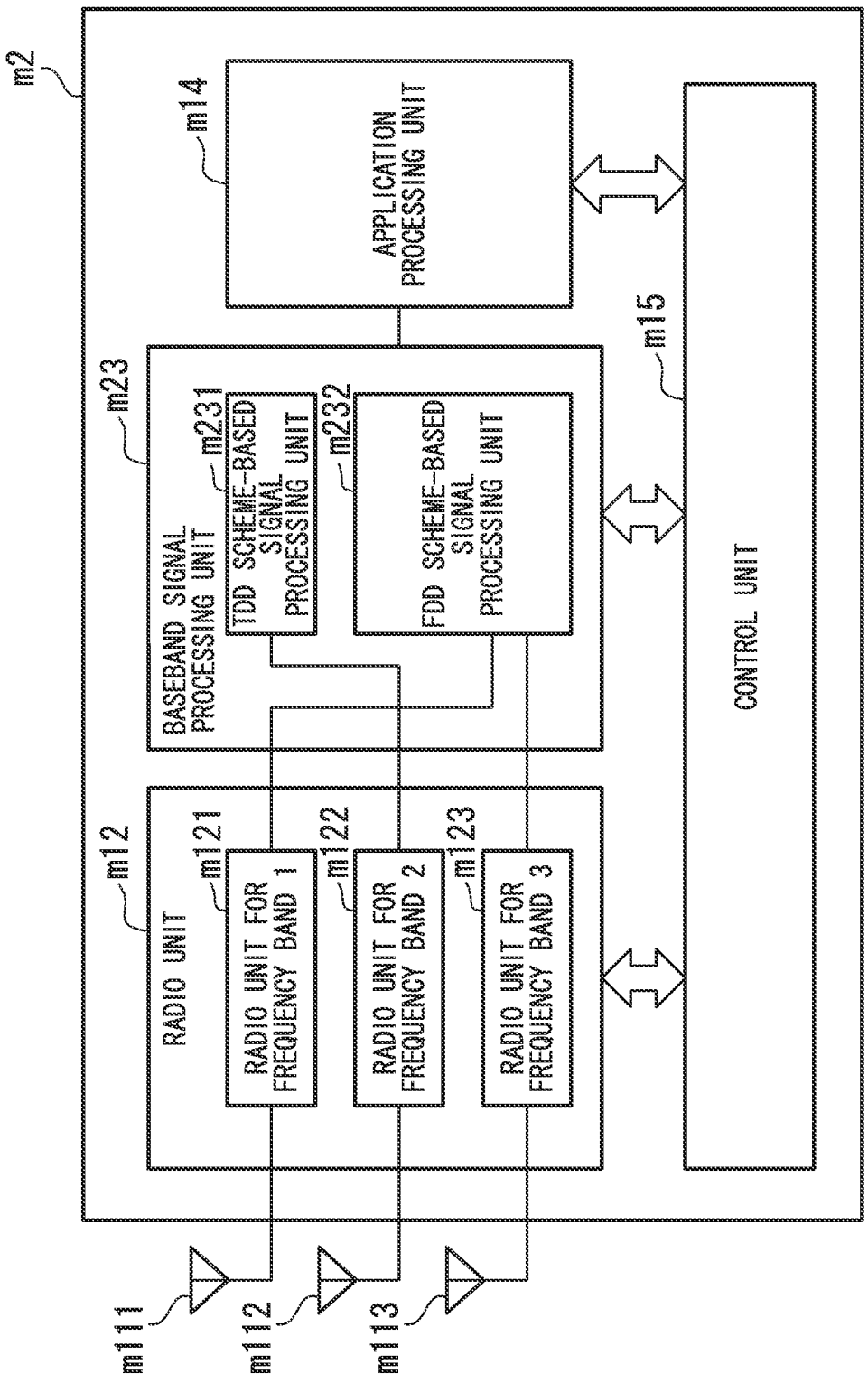

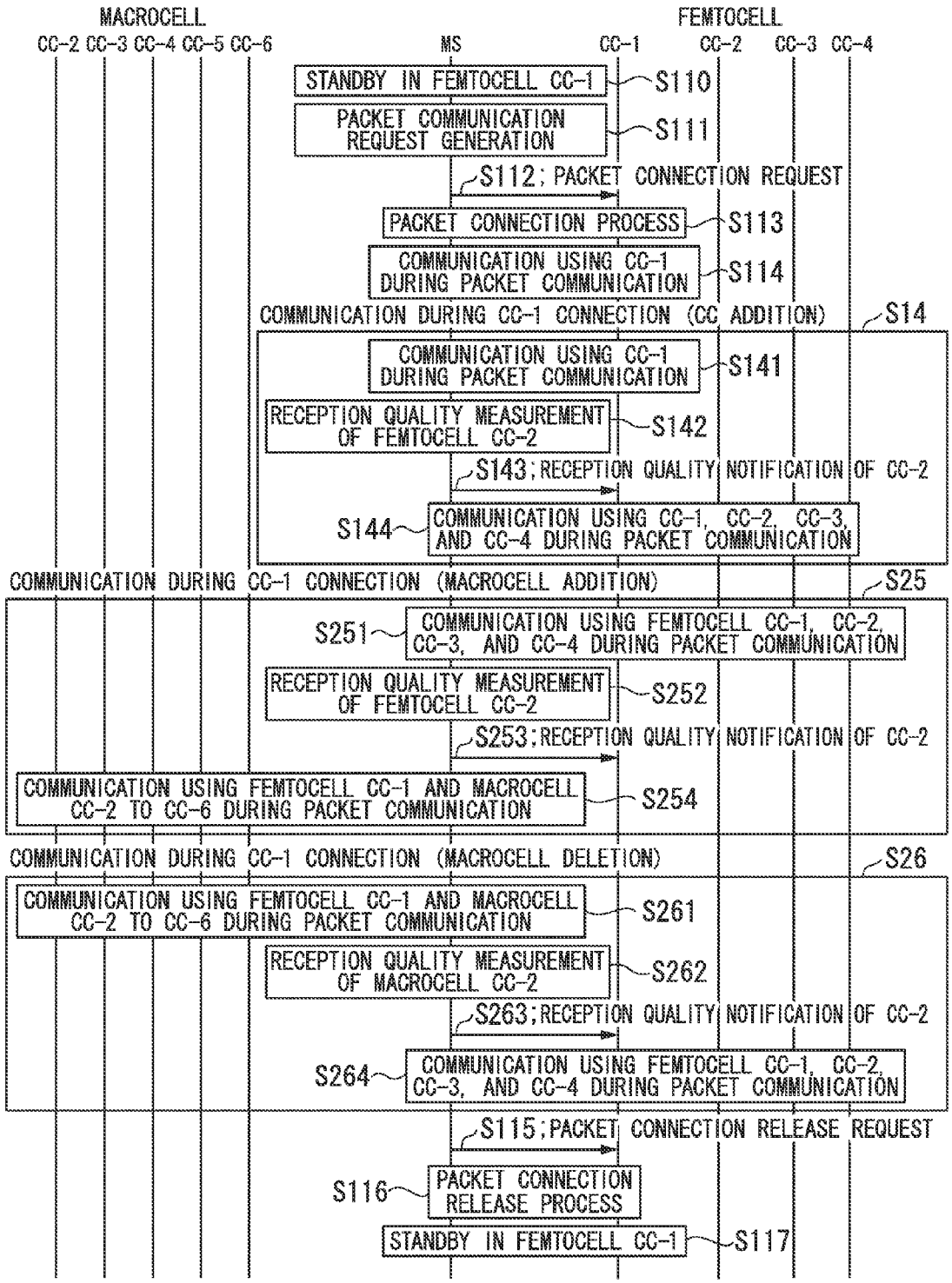

WIRELESS COMMUNICATION SYSTEM, BASE STATION APPARATUS, MOBILE STATION APPARATUS, COMMUNICATION CONTROL METHOD, AND COMMUNICATION CONTROL PROGRAM

TECHNICAL FIELD

The present invention relates to a wireless communication system, a base station apparatus, a mobile station apparatus, a communication control method, and a communication control program.

This application is based upon and claims the benefit of priority from prior Japanese Patent Application No. 2010-004132, filed Jan. 12, 2010, the entire contents of which are incorporated herein.

BACKGROUND ART

At present, communication services in mobile station apparatus are widely proliferated and used by a majority of people. Communication providers, which provide the communication services as described above, cover necessary service areas by installing a number of base station apparatus (referred to as a macrocell base station apparatus) capable of wireless communication in a communication range (macrocell) of which the radius is about several hundreds of meters to several kilometers, and provide various services such as voice communication, television (TV) telephony, and packet communication.

However, it is difficult to fully cover the entire service area in only a macrocell, and there is a place of a weak electric field in the vicinity of a boundary of the macrocell or in a place in which the reception of radio waves is difficult such as indoors. In the places as described above, there is a problem in that a sufficient communication speed is not obtained and the quality of call voice is not stable. In order to cover such places, the introduction of a base station apparatus (referred to as a femtocell base station apparatus) capable of wireless communication in a communication range (femtocell) of which the radius is about several meters to several tens of meters is being studied. The femtocell base station apparatus is different from a macrocell base station apparatus, and, for example, connected to a core network (CN) installed by a communication provider using a broadband link used in an individual home. Because the burden on the communication provider is reduced by using the broadband link or the like in communication using the femtocell base station apparatus as described above, communication cost is reduced as compared to communication using the macrocell base station apparatus.

In addition, in the femtocell base station apparatus, users are limited to a minority of users permitted by a user installing the femtocell base station apparatus. That is, because the femtocell base station apparatus is used by a limited minority of mobile station apparatus, the mobile station apparatus can perform stable communication at a high speed.

Even in $3^{rd}$ Generation Partnership Project (3GPP) in which third and subsequent generation communication schemes are being studied, specifications are being recommended for a home (evolved) Node B ((e)NodeB), a closed subscriber group (CSG) cell, or the like as a macrocell base station apparatus that covers a small-scale area such as a home (for example, Non-Patent Document 1).

As described above, in the femtocell, the mobile station apparatus can perform stable communication at a low cost and high speed.

On the other hand, in 3GPP, at present, Long Term Evolution-Advanced (LTE-A) is being studied as the next communication scheme of LTE. In LTE-A, there is a need to implement higher speed communication than in LTE, and support a wider band (a band of up to 100 MHz exceeding a band of 20 MHz of LTE) than in LTE.

However, it is difficult to secure a broadband continuous frequency domain for LTEA throughout the world, and it is necessary to maintain compatibility with LTE as much as possible. Carrier aggregation (CA) technology for securing a maximum bandwidth of 100 MHz and implementing high-speed and large-capacity communication by aggregating a plurality of carriers having a bandwidth of up to 20 MHz to perform communication has been proposed and agreed upon at the 3GPP radio access network (RAN) #53b meeting (Chapter 5 of Non-Patent Document 2).

In the CA technology, a carrier having a bandwidth of up to 20 MHz is referred to as a component carrier (CC). In addition, detailed specs such as signaling, channel arrangement, and mapping in CA are scheduled to be designed later, and various discussions for designing the specs are being conducted by each working group (WG) of 3GPP.

Here, if the CA technology is applied to communication in the above-described femtocell, higher-speed communication can be performed. However, there is a problem in that a signal of the femtocell is affected by interference from a signal of the macrocell in a range in which the macrocell and the femtocell overlap.

For this problem, for example, discussions on technology related to a radio layer 1 are ongoing in WG of RAN 1. In this WG, discussions on necessary types of CCs are also ongoing. For example, Non-Patent Document 3 is a contribution presented to study types of CCs. Non-Patent Document 3 discloses a frequency arrangement method to which the CA technology is applied when there is a small-size base station apparatus (femtocell base station apparatus) having a lower transmission power than a macrocell base station apparatus.

Specifically, Non-Patent Document 3 discloses the frequency arrangement method in which a macrocell base station apparatus and a femtocell base station apparatus use separate CCs. In addition, as disclosed in Non-Patent Document 3, although different CCs are normally used in a macrocell and a femtocell, the same CC is switched and used in the macrocell and the femtocell only when the CA technology is applied in the femtocell.

PRIOR ART DOCUMENTS

Non-Patent Documents

Non-Patent Document 1: "Service requirements for Home NodeBs and Home eNodeBs," 3GPP TS 22.220

Non-Patent Document 2: 3GPP TR36.814 V0.4.1

Non-Patent Document 3: NTT Docomo, "Views on Component Carrier Types for Carrier Aggregation in LTE-Advanced," R1-093507

DISCLOSURE OF INVENTION

Problem to be Solved by the Invention

However, as disclosed in Non-Patent Document 3, when the same CC (referred to as a common frequency band; common CC) is switched and used in the macrocell and the femtocell (while a camp-on process is performed), a signal of the femtocell is affected by interference from a signal of the macrocell in CCs other than the common CC. In addition, at this time, when the CA technology is also applied to communication in the macrocell, a signal of the common CC may be affected by interference from a signal of the macrocell. That is, there is a disadvantage in that it is difficult to completely eliminate the interference of the signal of the macrocell with the signal of the femtocell. If the interference occurs, the mobile station apparatus may be unable to stably communicate with the femtocell base station apparatus at a high speed.

As described above, the related art has a disadvantage in that the mobile station apparatus may be unable to stably communicate with the base station apparatus when interference occurs due to a signal from another apparatus in a part of a frequency band to be used for communication.

The present invention has been made in view of such circumstances, and provides a wireless communication system, a base station apparatus, a mobile station apparatus, a communication control method, and a communication control program, which can enable a mobile station apparatus to stably communicate with a base station apparatus even when interference occurs due to a signal from another apparatus in a part of a frequency band to be used for communication.

Means to Solve the Problem (1) The invention was made to solve the above-described problems, first aspect of the present invention is a wireless communication system comprising a plurality of base station apparatuses and a plurality of mobile station apparatuses which communicate with the base station apparatuses, wherein: a first base station apparatus communicates with the mobile station apparatus using a plurality of frequency bands, a second base station apparatus communicates with the mobile station apparatus using a common frequency band, which is all or part of a frequency band to be used for communication by the first base station apparatus, and a dedicated frequency band to be unused by the first base station apparatus, and the second base station apparatus comprises a communication band selection unit which selects the common frequency band as a frequency band to be used for communication with the mobile station apparatus in case that radio quality of the common frequency band in the mobile station apparatus is greater than a predetermined threshold value, and selects the dedicated frequency band as the frequency band to be used for the communication with the mobile station apparatus in case that the radio quality of the common frequency band in the mobile station apparatus is less than the predetermined threshold value, and the mobile station apparatus or the second base station apparatus comprises a mobile station radio control unit which controls communication of the mobile station apparatus with the second base station apparatus using the common frequency band in case that the radio quality of the common frequency band is greater than the predetermined threshold value, and controls the communication of the mobile station apparatus with the second base station apparatus using the dedicated frequency band in case that the radio quality of the common frequency band is less than the predetermined threshold value.

(2) In the first aspect of the present invention, the mobile station apparatus may include a connection base station selection unit which establishes a connection to the second base station apparatus using the dedicated frequency band in case that a signal has been detected in the dedicated frequency band in case that no connection to the second base station apparatus has been established.

(3) In the first aspect of the present invention, the mobile station radio control unit may control transmission or reception of control information for controlling communication using the dedicated frequency band.

(4) In the first aspect of the present invention, the communication band selection unit may select a part of the common frequency band as an incoming call monitoring frequency band in which the mobile station apparatus monitors incoming call notification in case that the radio quality of the common frequency band in the mobile station apparatus is greater than the predetermined threshold value, and select the dedicated frequency band as the incoming call monitoring frequency band in which the mobile station apparatus monitors the incoming call notification in case that the radio quality of the common frequency band in the mobile station apparatus is less than the predetermined threshold value, and the mobile station radio control unit may control monitoring of the incoming call notification in the part of the common frequency band in case that the radio quality of the common frequency band is greater than the predetermined threshold value and monitoring of the incoming call notification in the dedicated frequency band in case that the radio quality of the common frequency band is less than the predetermined threshold value.

(5) In the first aspect of the present invention, the part of the common frequency band may be a predetermined quality measurement frequency band, and the radio quality of the common frequency band may be radio quality of the quality measurement frequency band.

(6) In the first aspect of the present invention, the mobile station apparatus may include a connection base station selection unit which establishes a connection to the second base station apparatus using the dedicated frequency band in case that a signal has been detected in the dedicated frequency band in case that no connection to the second base station apparatus has been established, and the second base station apparatus may include a base station radio control which controls stopping of a signal which is transmitted in the common frequency band in case that all the mobile station apparatuses are not connected.

(7) In the first aspect of the present invention, the base station radio control unit may control stopping of a signal which is transmitted in the common frequency band other than the quality measurement frequency band in case that the communication band selection unit selects only the dedicated frequency band as a frequency band to be used for communication with the mobile station apparatus.

(8) In the first aspect of the present invention, the first base station apparatus may perform communication in a wider range than the second base station apparatus.

(9) In the first aspect of the present invention, communication of a time division duplex scheme may be used in the dedicated frequency band.

(10) In the first aspect of the present invention, the mobile station apparatus or the second base station apparatus may control communication with the first base station apparatus based on the radio quality of the common frequency band of the first base station apparatus and the mobile station apparatus.

(11) A second aspect of the present invention is a second base station apparatus, which performs communication with a mobile station apparatus using a plurality of frequency bands including a common frequency band, which is a frequency band to be used for communication of a first base station apparatus and the second base station apparatus with the mobile station apparatus, and a dedicated frequency band, which is a frequency band to be used by only the second base station apparatus for the communication with the mobile station apparatus.

(12) In the second aspect of the present invention, the second base station apparatus may include: a communication band selection unit which selects all or some of the plurality of frequency bands comprising the common frequency band as the frequency band to be used for the communication with the mobile station apparatus in case that radio quality of the common frequency band in the mobile station apparatus is greater than a predetermined threshold value, and selects all or part of the dedicated frequency band as the frequency band to be used for the communication with the mobile station apparatus in case that the radio quality of the common frequency band in the mobile station apparatus is less than the predetermined threshold value.

(13) In the second aspect of the present invention, control information which controls the communication may be transmitted or received using the dedicated frequency band in the communication with the mobile station apparatus.

(14) In the second aspect of the present invention, a signal which is transmitted in the common frequency band may be stopped in case that all the mobile station apparatuses are not connected.

(15) In the second aspect of the present invention, the communication may be stopped in a common frequency band other than a quality measurement frequency band to be used for measurement of radio quality, which is a part of the common frequency band, in case that communication with the mobile station apparatus is performed in only the dedicated frequency band.

(16) In the second aspect of the present invention, communication of a time division duplex scheme may be used in the dedicated frequency band.

(17) In the second aspect of the present invention, the communication with the first base station apparatus may be controlled based on radio quality of the common frequency band of the first base station apparatus and the mobile station apparatus.

(18) A third aspect of the present invention is a mobile station apparatus, which performs communication with a second base station apparatus using a plurality of frequency bands comprising a common frequency band, which is a frequency band to be used for communication with a first base station apparatus and the second base station apparatus, and a dedicated frequency band, which is a frequency band to be used for communication with only the second base station apparatus.

(19) In the third aspect of the present invention, the communication with the second base station apparatus may be controlled using the plurality of frequency bands comprising the common frequency band in case that radio quality of the common frequency band is greater than a predetermined threshold value, and the communication with the second base station apparatus may be controlled using the dedicated frequency band in case that the radio quality of the common frequency band is less than the predetermined threshold value.

(20) In the third aspect of the present invention, in case that a connection to the second base station apparatus is established, the connection may be performed using the dedicated frequency band.

(21) In the third aspect of the present invention, control information for controlling the communication may be transmitted or received using the dedicated frequency band in the communication with the second base station apparatus.

(22) In the third aspect of the present invention, in case that the communication with the second base station apparatus is performed in only the dedicated frequency band, radio quality of a quality measurement frequency band, which is a part of the common frequency band, may be measured as radio quality of the common frequency band.

(23) In the third aspect of the present invention, communication of a time division duplex scheme may be used in the dedicated frequency band.

(24) In the third aspect of the present invention, the communication with the first base station apparatus may be controlled based on radio quality of the common frequency band of the first base station apparatus and the mobile station apparatus.

(25) A fourth aspect of the present invention is a communication control method for use in a base station apparatus, the communication control method comprising: performing communication with a mobile station apparatus using a plurality of frequency bands including a common frequency band, which is a frequency band to be used for communication of a first base station apparatus and a second base station apparatus with the mobile station apparatus, and a dedicated frequency band, which is a frequency band to be used by only the second base station apparatus for the communication with the mobile station apparatus.

(26) A fifth aspect of the present invention is a communication control method for use in a mobile station apparatus, the communication control method comprising: performing communication with a second base station apparatus using a plurality of frequency bands including a common frequency band, which is a frequency band to be used for communication with a first base station apparatus and the second base station apparatus, and a dedicated frequency band, which is a frequency band to be used for communication with only the second base station apparatus.

(27) A sixth aspect of the present invention is a communication control program for causing a computer of a base station apparatus to function as: performing communication with a mobile station apparatus using a plurality of frequency bands including a common frequency band, which is a frequency band to be used for communication of a first base station apparatus and a second base station apparatus with the mobile station apparatus, and a dedicated frequency band, which is a frequency band to be used by only the second base station apparatus for the communication with the mobile station apparatus.

(28) A seventh aspect of the present invention is a communication control program for causing a computer of a mobile station apparatus to function as: performing communication with a second base station apparatus using a plurality of frequency bands including a common frequency band, which is a frequency band to be used for communication with a first base station apparatus and the second base station apparatus, and a dedicated frequency band, which is a frequency band to be used for communication with only the second base station apparatus.

Effect of the Invention

According to the present invention, a mobile station apparatus can stably communicate with a base station apparatus even when interference occurs due to a signal from another apparatus in a part of a frequency band used for communication.

BRIEF DESCRIPTION OF THE DRAWINGS

FIG. 14 is a schematic block diagram illustrating a configuration of a mobile station apparatus according to this embodiment.

FIG. 15 is a sequence diagram illustrating an example of an operation of a wireless communication system according to a third embodiment of the present invention.

BEST MODE FOR CARRYING OUT THE INVENTION (First Embodiment)

Hereinafter, the first embodiment of the present invention will be described in detail with reference to the drawings.

Figure 1:
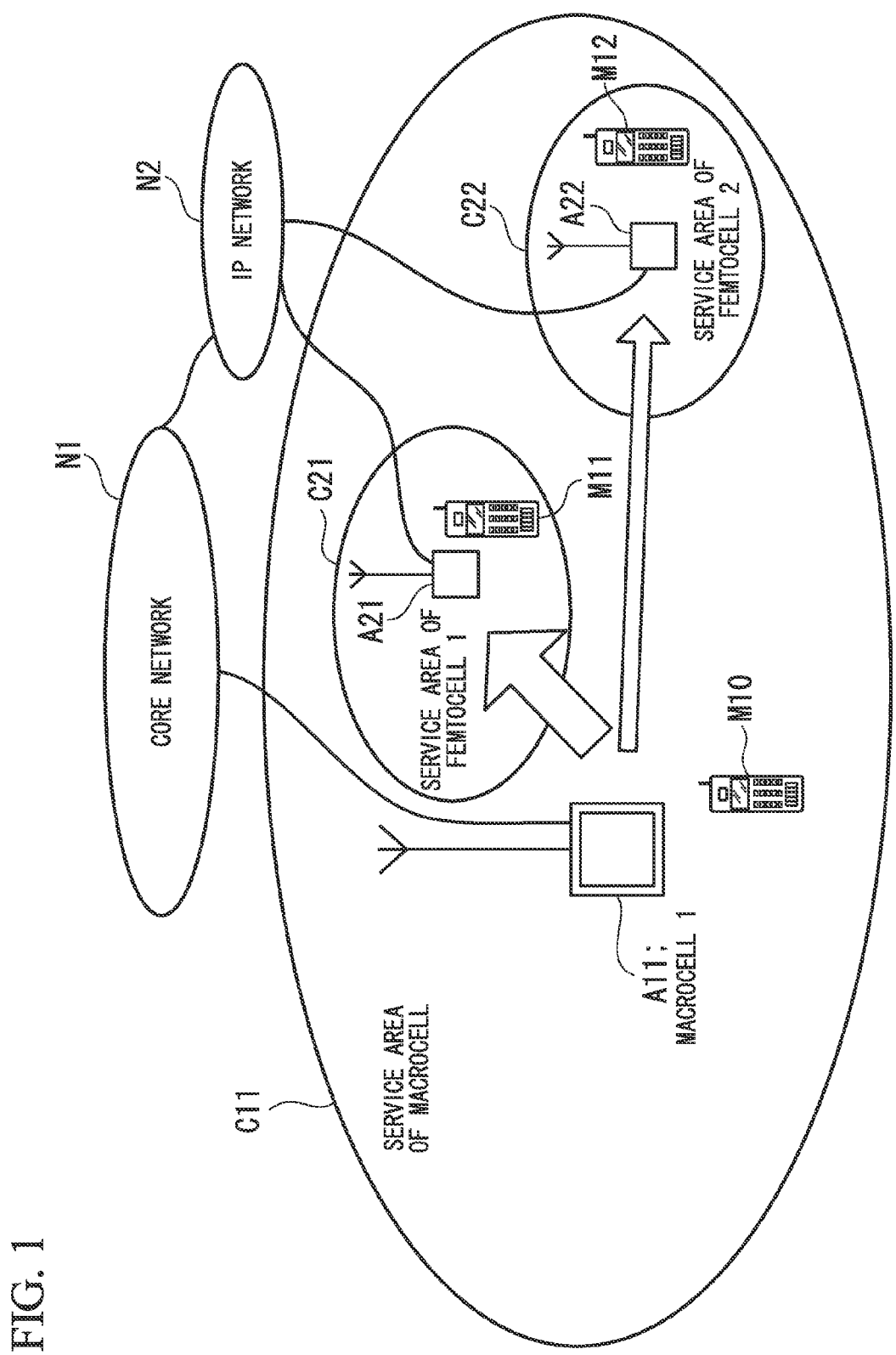
FIG. 1 is a schematic diagram illustrating a wireless communication system according to a first embodiment of the present invention.

FIG. 1 is a schematic diagram illustrating a wireless communication system according to the embodiment of the present invention. In this drawing, the wireless communication system includes a macrocell base station apparatus A11, femtocell base station apparatus A21 and A22, and mobile station apparatus M10 to M12. In addition, an Internet protocol (IP) network N2 is connected to a CN N1.

The macrocell base station apparatus A11 is connected to the CN N1. In addition, the macrocell base station apparatus A11 wirelessly communicates with the mobile station apparatus M10 to M12 in a communication range (macrocell) C11 having a radius of about several hundreds of meters to several kilometers. Here, the macrocell base station apparatus A11 performs communication of an orthogonal frequency division multiplexing (OFDM) scheme in communication of downlink (from the macrocell base station apparatus A11 to the mobile station apparatus M10). In addition, the macrocell base station apparatus A11 performs communication using CA technology. Here, the CA technology is technology for communicating a signal using a plurality of frequency bands having a maximum of 20 MHz, which are referred to as CCs.

The femtocell base station apparatus A21 and A22 are connected to the IP network N2.

In addition, the femtocell base station apparatus A21 and A22 are smaller-size base station apparatus than the macrocell base station apparatus A11, and each wirelessly communicate with the mobile station apparatus M10 to M12 in communication ranges (femtocells) C21 and C22 each having a radius of about several meters to several tens of meters. The femtocell base station apparatus A21 and A22 are installed in a place in which wireless communication quality is not secured in communication with the macrocell base station apparatus A11, for example, due to a bad wireless communication environment. In addition, for example, the femtocell base station apparatus A21 and A22 installed in homes provide high-quality service to limited users. Here, the femtocell base station apparatus A21 and A22 perform communication to which the CA technology has been applied. Although the two femtocell base station apparatus A21 and A22 are disclosed in FIG. 1, the number of femtocell base station apparatus may be one, three, or more.

Compared to the femtocell base station apparatus A22, the femtocell base station apparatus A21 is installed in a position near the macrocell base station apparatus A11. Because the macrocell base station apparatus A11 transmits and receives a signal in the macrocell C11, regardless of installation situations of the femtocell base station apparatus A21 and A22, there is interference with signals of the femtocells C21 and C22 transmitted by the femtocell base station apparatus A21 and A22, respectively. The interference received from the signal of the femtocell C21 near the macrocell C11 is larger.

The mobile station apparatus M10 is located in an area of the macrocell C11, and wirelessly communicates with the macrocell base station apparatus A11. The mobile station apparatus M11 is located in areas of the macrocell C11 and the femtocell C21, and wirelessly communicates with the femtocell base station apparatus A21. The mobile station apparatus M12 is located in areas of the macrocell C11 and the femtocell C22, and wirelessly communicates with the femtocell base station apparatus A22.

Figure 2:
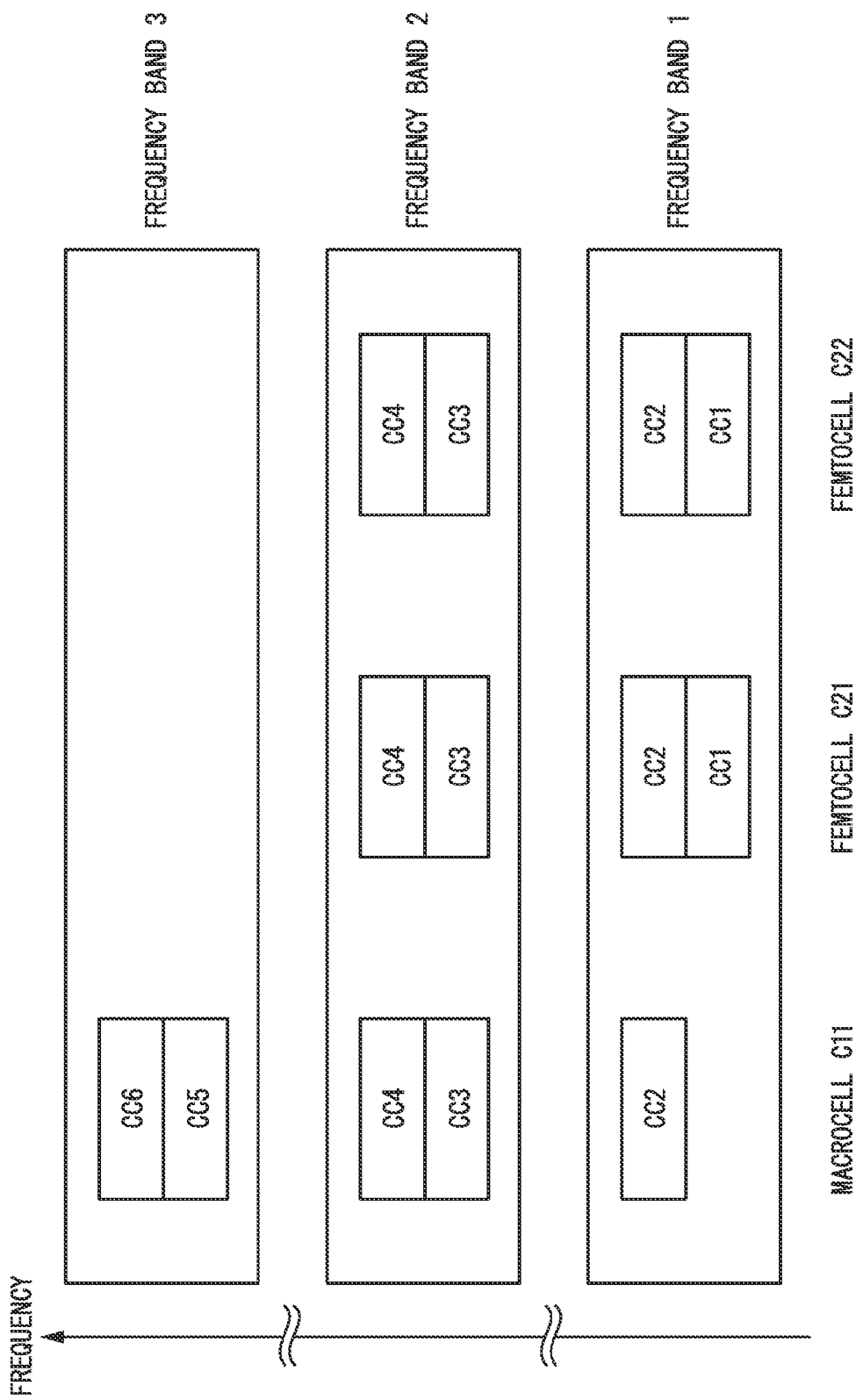
FIG. 2 is a schematic diagram illustrating an example of CC allocation according to this embodiment.

FIG. 2 is a schematic diagram illustrating an example of CC allocation according to this embodiment. In this drawing, the vertical axis represents frequency and CC allocation for each base station apparatus is illustrated (on the horizontal axis).

In FIG. 2, the frequency is divided into three frequency bands (frequency bands 1, 2, and 3 in ascending order of frequency). These frequency bands are, for example, frequency bands such as bands of 800 MHz, 1.5 GHz, 2 GHz, and 3 GHz. In addition, a plurality of frequency bands are provided in each frequency band. This frequency band is, for example, a carrier of a maximum of 20 MHz.

As illustrated in FIG. 2, in the macrocell C11, communication can be performed using all the frequency bands 1, 2, and 3, and communication can be performed using five CCs of CC-2 to CC-6. CC-1 is used in the femtocells C21 and C22 and not used in the macrocell C11.

In addition, as illustrated in FIG. 2, in the femtocells C21 and C22, communication can be performed using the frequency bands 1 and 2 and communication can be performed using four CCs of CC-1 to CC-4. Although communication can be performed using all the frequency bands in the femtocells C21 and C22, it is possible to reduce cost and power consumption of the femtocell base station apparatus A21 and A22 by limiting a frequency band to be used for communication.

Only the femtocells C21 and C22 designate CC-1 to be used for communication as a femtocell-dedicated CC (a dedicated frequency band). In addition, CC-2, CC-3, and CC-4 available to communication for the macrocell C11 and both the femtocells C21 and C22 are referred to as common CCs. In the femtocells C21 and C22, an interference level is measured in one CC of the common CCs (this CC is designated as a quality measurement frequency band; priority CC).

In this embodiment, CC-2 is used as the priority CC. A band of the priority CC is predetermined and its value (CC-2) is recorded on a built-in memory in the femtocell base station apparatus A21 and A22 and the mobile station apparatus M10 to M12, so that the priority CC may be designated and reported by notification information from the femtocell. Alternatively, when a connection to the femtocell-dedicated CC is established, the notification may be provided from the femtocell base station apparatus A21 and A22 to the mobile station apparatus M11 and M12 using separate communication channels. It is possible to select a CC most vulnerable to interference in an installed environment as the priority CC by providing the notification from the femtocell base station apparatus A21 and A22 to the mobile station apparatus M11 and M12.

Here, CC-2 is a CC having a lowest frequency among CCs used in the femtocell. Propagation loss to a propagation distance is small at a low frequency. In addition, a CC having the low frequency is also susceptible to penetrating through an indoor space or the like. In this embodiment, it is possible to measure the quality of CC-2 most prone to interference among the common CCs using CC-2 having the lowest frequency. For example, as will be described later, it is possible to determine that all CCs are available to CA if CC-2 has sufficient quality.

In addition, when the mobile station apparatus M10 to M12 waits for the notification to be received (in a waiting state), the mobile station apparatus M10 to M12 monitor the presence/absence of communication in a state in which only one or more CCs allocated from a base station apparatus (the macrocell base station apparatus A11 or the femtocell base station apparatus A21 and A22) of a communication partner can be received. This CC is referred to as an anchor carrier.

Hereinafter, the macrocell base station apparatus A11 is referred to as a macrocell base station apparatus a1, each of the femtocell base station apparatus A21 and A22 is referred to as a femtocell base station apparatus a2, and each of the mobile station apparatus M10 to M12 is referred to as a mobile station apparatus m1.

<Configuration of Macrocell Base Station Apparatus a1>

Figure 3:
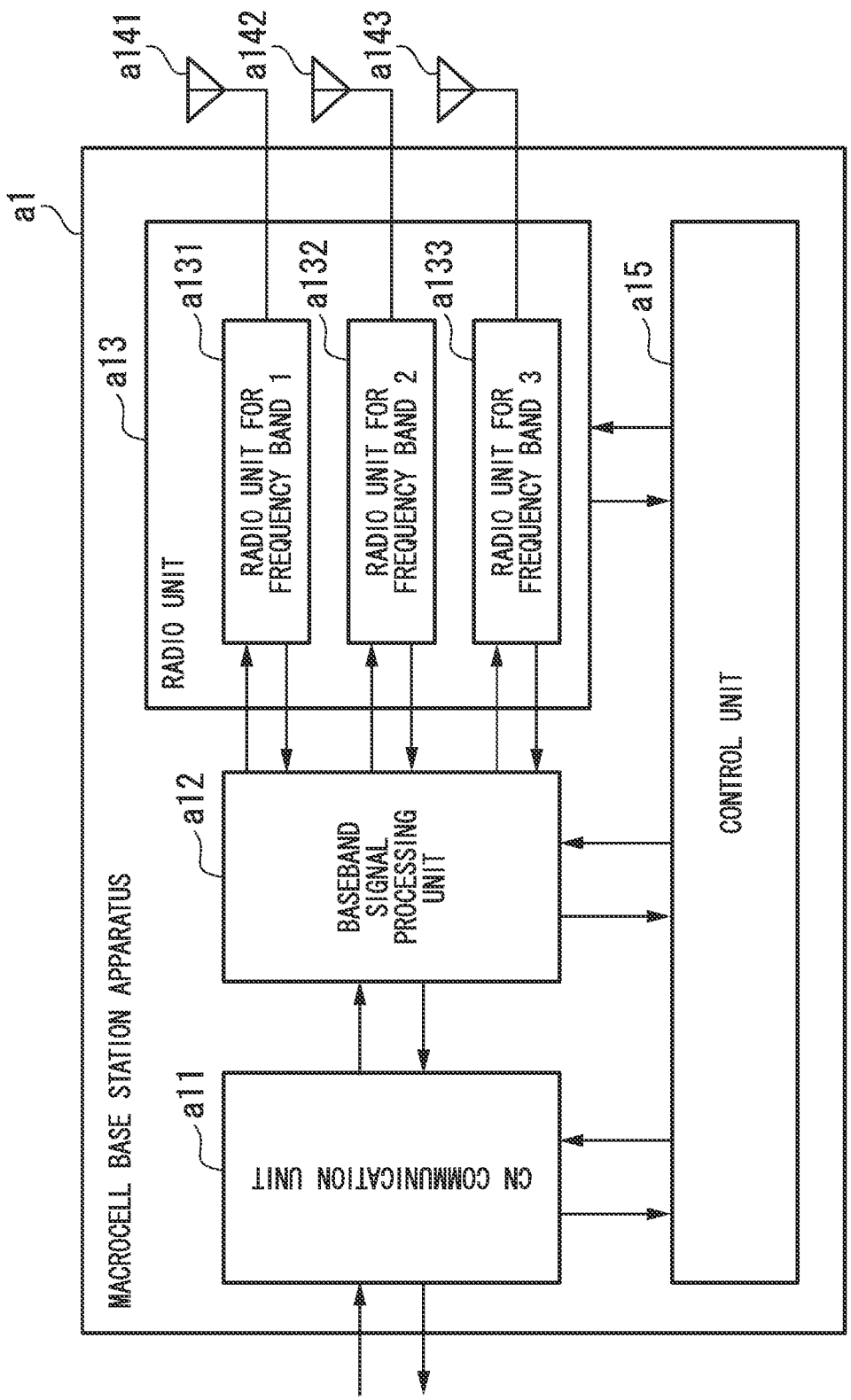
FIG. 3 is a schematic block diagram illustrating a configuration of a macrocell base station apparatus according to this embodiment.

FIG. 3 is a schematic block diagram illustrating a configuration of the macrocell base station apparatus a1 according to this embodiment. In this drawing, the macrocell base station apparatus a1 includes a CN communication unit a11, a baseband signal processing unit a12, a radio unit a13, antennas a141 to a143, and a control unit a15. The radio unit a13 includes a radio unit a131 for a frequency band 1, a radio unit a132 for a frequency band 2, and a radio unit a133 for a frequency band 3.

The CN communication unit a11 is connected to the CN N1. The CN communication unit a11 outputs data obtained by removing data to be used for communication control of the CN N1 from data received from another apparatus via the CN N1 or data generated by combining a plurality of data described above to the baseband signal processing unit a12.

In addition, the CN communication unit a11 adds data to be used for communication control with the CN N1 to data input from the baseband signal processing unit a12 or data divided in a size corresponding to communication of the CN, and transmits the data to another apparatus via the CN N1.

The baseband signal processing unit a12 designates data input from the CN communication unit a11 as user data, and performs a scrambling process for mixing data, an encoding process, and a modulation process for the user data and the control data input from the control unit a15. The baseband signal processing unit a12 maps a signal generated by performing these processes to a radio resource (time-frequency band). The baseband signal processing unit a12 performs a frequency-time transform (inverse Fourier transform) on the mapped signal. The baseband signal processing unit a12 performs a process of inserting a cyclic prefix (CP) into a signal subjected to the frequency-time transform. The baseband signal processing unit a12 outputs signals arranged in the frequency bands 1, 2, and 3 among signals subjected to the CP insertion process to the radio unit a131 for the frequency band 1, the radio unit a132 for the frequency band 2, and the radio unit a133 for the frequency band 3 according to control from the control unit a15.

In addition, the baseband signal processing unit a12 performs a CP removal process for signals input from the radio unit a131 for the frequency band 1, the radio unit a132 for the frequency band 2, and the radio unit a133 for the frequency band 3. The baseband signal processing unit a12 performs a time-frequency transform (Fourier transform) on the signal subjected to the CP removal process. The baseband signal processing unit a12 de-maps the signal subjected to the time-frequency transform from a radio resource according to control from the control unit a15. The baseband signal processing unit a12 performs a demodulation process, a decoding process, and a descrambling process for the de-mapped signal. Here, the descrambling process is a process inverse to mixing of data in the scrambling process. The baseband signal processing unit a12 divides data generated by performing these processes into control data to be used for control of wireless communication and user data excluding the control data. The baseband signal processing unit a12 outputs the control data of the divided data to the control unit a15, and outputs the user data to the CN communication unit a11.

The radio unit a131 for the frequency band 1 converts a signal input from the baseband signal processing unit a12 according to digital-to-analog conversion, up-converts an analog signal after the conversion from a baseband into a radio frequency band of the frequency band 1, and transmits the up-converted analog signal to the mobile station apparatus m1 via the antenna a141.

In addition, the radio unit a131 for the frequency band 1 receives a signal from the mobile station apparatus m1 via the antenna a141, and down-converts the received signal from the radio frequency band of the frequency band 1 into the baseband. The radio unit a131 for the frequency band 1 converts the down-converted signal according to analog-to-digital conversion, and outputs the converted signal to the baseband signal processing unit a12.

As described above, the radio unit a131 for the frequency band 1 performs a process in the frequency band 1. For example, the radio unit a131 for the frequency band 1 arranges and transmits a signal in CC-2 of FIG. 2, and receives a signal arranged in CC-2. In an example of FIG. 2, the radio unit a131 for the frequency band 1 does not receive a signal arranged in CC-1 without arranging a signal in CC-1.

On the other hand, the radio unit a132 for the frequency band 2 and the radio unit a133 for the frequency band 3 perform the same process as in the radio unit a131 for the frequency band 1 with respect to the frequency bands 2 and 3. For example, the radio unit a132 for the frequency band 2 arranges and transmits signals in CC-3 and CC-4 of FIG. 2, and receives signals arranged in CC-3 and CC-4. Likewise, the radio unit a133 for the frequency band 3 arranges and transmits signals in CC-5 and CC-6 of FIG. 2, and receives signals arranged in CC-5 and CC-6.

The control unit a15 controls the CN communication unit a11, the baseband signal processing unit a12, and the radio unit a13 according to a communication protocol. For example, according to a wireless communication protocol, the control unit a15 controls the baseband signal processing unit a12 to perform various processes such as mapping, de-mapping, an encoding process, a decoding process, a modulation process, and a demodulation process.

In addition, for example, the control unit a15 measures an amount of user data that is transmitted by the baseband signal processing unit a12, a capacity of a signal that is transmitted by the radio unit using each CC, and a capacity of a signal received by the radio unit using each CC. In addition, the control unit a15 acquires radio quality information of each frequency band (for example, CC) measured by the mobile station apparatus m1 as control data transmitted by each mobile station apparatus m1.

The control unit a15 determines a CC to be used for wireless communication with each mobile station apparatus m1 on the basis of the measurement result and the acquired radio quality information. One or more CCs may be allocated to one mobile station apparatus m1. Specifically, when CC-3 is allocated to a certain mobile station apparatus m1 as an anchor carrier, only CC-3 is allocated to the mobile station apparatus m1 if an amount of user data is small, that is, if the mobile station apparatus m1 performs communication having a comparatively small data amount such as voice communication. On the other hand, when CC-2 is allocated to a certain mobile station apparatus m1 as the anchor carrier, all CCs of CC-2 to CC-6 are allocated to the mobile station apparatus m1 if the amount of user data is large, that is, if the mobile station apparatus m1 performs communication having a comparatively large data amount such as moving-image download. However, the CC allocated here may have higher radio quality than a predetermined value or higher radio quality than other CCs.

Although a configuration in which a radio unit and an antenna are provided for each frequency band in the macrocell base station apparatus a1 of FIG. 3 has been described, the present invention is not limited thereto. A radio unit and an antenna may be provided for each CC, and one radio unit and one antenna may be provided for all frequency bands. In addition, although the case in which one antenna is connected to one radio unit in the macrocell base station apparatus a1 has been described, the present invention is not limited thereto. A plurality of antennas may be connected to one radio unit. In this case, the macrocell base station apparatus a1 may perform communication of a multiple input multiple output (MIMO) scheme. In addition, although the case in which the macrocell base station apparatus a1 transmits and receives a signal via one antenna has been described, the present invention is not limited thereto. The macrocell base station apparatus a1 may include a transmitting antenna and a receiving antenna to transmit and receive signals via the transmitting antenna and the receiving antenna.

<Configuration of Femtocell Base Station Apparatus a2>

Figure 4:
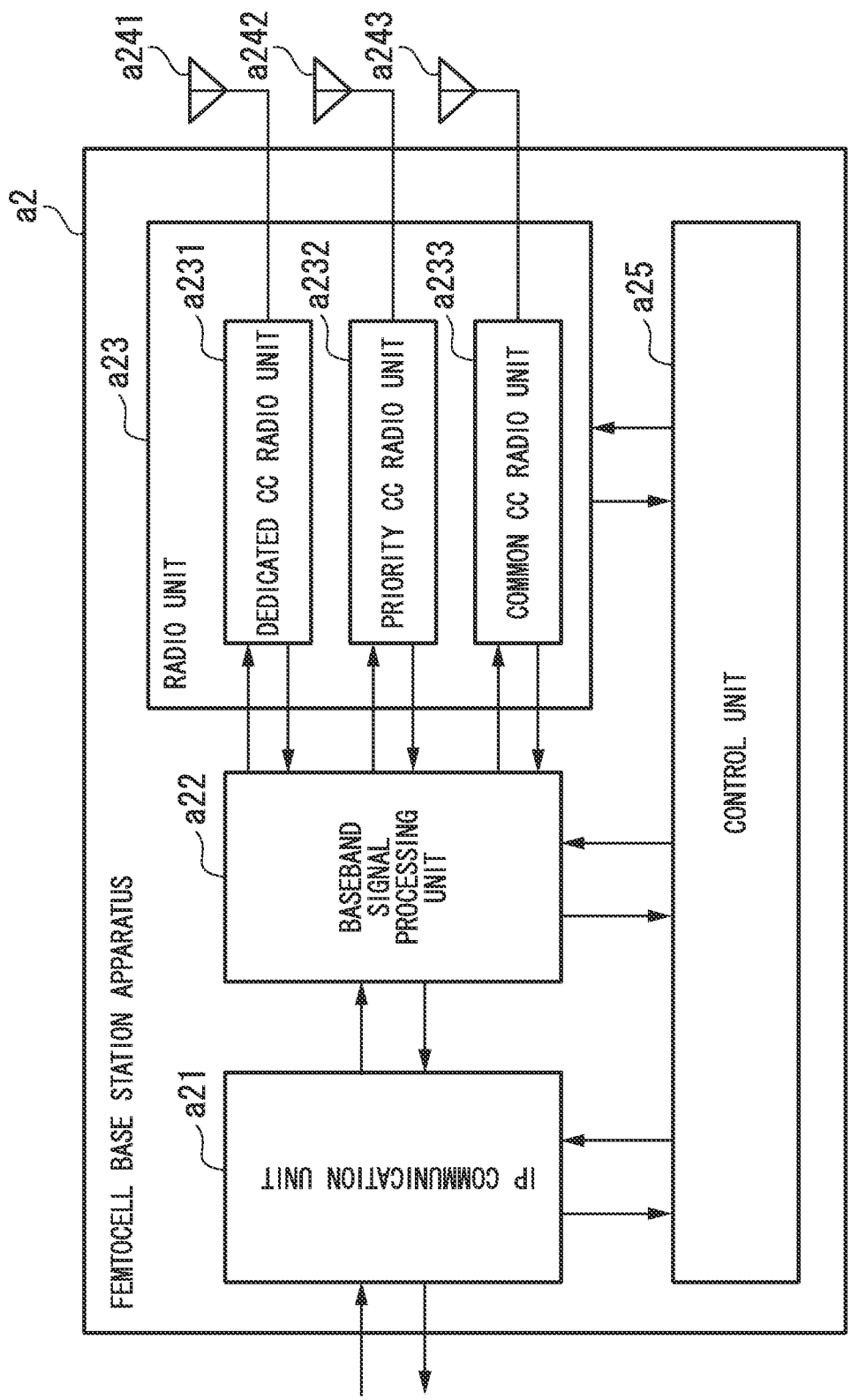
FIG. 4 is a schematic block diagram illustrating a configuration of a femtocell base station apparatus according to this embodiment.

FIG. 4 is a schematic block diagram illustrating a configuration of the femtocell base station apparatus a2 according to this embodiment. In this drawing, the femtocell base station apparatus a2 includes an IP communication unit a21, a baseband signal processing unit a22, a radio unit a23, antennas a241 to a243, and a control unit a25. The radio unit a23 includes a dedicated CC radio unit a231, a priority CC radio unit a232, and a common CC radio unit a233.

The IP communication unit a21 is connected to an IP network N2. The IP communication unit a21 outputs data obtained by removing data to be used for communication control of the IP network N2 from data received from another apparatus connected to the CN N1 via the IP network N2 or data generated by combining a plurality of data described above to the baseband signal processing unit a22.

In addition, the IP communication unit a21 adds data to be used for communication control of the IP network N2 to data input from the baseband signal processing unit a22 or data divided in a size corresponding to communication of the CN, and transmits the data to another apparatus via the IP network N2.

The baseband signal processing unit a22 designates data input from the IP communication unit a21 as user data, and performs a scrambling process for mixing data, an encoding process, and a modulation process for the user data and the control data input from the control unit a25. The baseband signal processing unit a22 maps a signal generated by performing these processes to a radio resource (time-frequency band). The baseband signal processing unit a22 performs a frequency-time transform (inverse Fourier transform) on a mapped signal. The baseband signal processing unit a22 performs a process of inserting a CP to a signal subjected to the frequency-time transform. The baseband signal processing unit a22 outputs signals arranged in the femtocell-dedicated cell CC (CC-1) of the frequency band 1, the priority CC (CC-2), and the common CC (frequency band 2) other than the priority CC among signals subjected to the CP insertion process to the dedicated CC radio unit a231, the priority CC radio unit a232, and the common CC radio unit a233 according to control from the control unit a25.

In addition, the baseband signal processing unit a22 performs a CP removal process for signals input from the dedicated CC radio unit a231, the priority CC radio unit a232, and the common CC radio unit a233. The baseband signal processing unit a22 performs a time-frequency transform (Fourier transform) for the signal subjected to the CP removal process. The baseband signal processing unit a22 de-maps the signal subjected to the time-frequency transform from a radio resource according to control from the control unit a25. The baseband signal processing unit a22 performs a demodulation process, a decoding process, and a descrambling process for the de-mapped signal. Here, the descrambling process is a process inverse to mixing of data in the scrambling process. The baseband signal processing unit a22 divides data generated by performing these processes into control data to be used for control of wireless communication and user data excluding the control data. The baseband signal processing unit a22 outputs the control data of the divided data to the control unit a15, and outputs the user data to the IP communication unit a21.

The dedicated CC radio unit a231 converts a signal input from the baseband signal processing unit a22 according to digital-to-analog conversion, up-converts an analog signal after the conversion from a baseband into a radio frequency band of the femtocell-dedicated CC, and transmits the up-converted analog signal to the mobile station apparatus m1 via the antenna a241.

In addition, the dedicated CC radio unit a231 receives a signal from the mobile station apparatus m1 via the antenna a241, and down-converts the received signal from the radio frequency band of the femtocell-dedicated CC into the baseband. The dedicated CC radio unit a231 converts the down-converted signal according to analog-to-digital conversion, and outputs the converted signal to the baseband signal processing unit a22.

As described above, the dedicated CC radio unit a231 processes a femtocell-dedicated CC. On the other hand, the priority CC radio unit a232 and the common CC radio unit a233 perform the same process as in the dedicated CC radio unit a231 for the priority CC and the common CC other than the priority CC. For example, the priority CC radio unit a232 arranges and transmits a signal in CC-2 of FIG. 2, and receives a signal arranged in CC-2. Likewise, the common CC radio unit a233 arranges and transmits signals in CC-3 and CC-4 of the frequency band 2 of FIG. 2, and receives signals arranged in CC-3 and CC-4.

The control unit a25 authenticates the mobile station apparatus m1, determines whether or not to permit a wireless connection to its own apparatus, and establishes the wireless connection with the mobile station apparatus m1 determined to be permitted.

In addition, according to a communication protocol, the control unit a25 controls the IP communication unit a21, the baseband signal processing unit a22, and the radio unit a23. For example, according to a wireless communication protocol, the control unit a25 controls the baseband signal processing unit a22 to perform various processes such as mapping, de-mapping, an encoding process, a decoding process, a modulation process, and a demodulation process.

In addition, for example, the control unit a25 measures an amount of user data that is transmitted by the baseband signal processing unit a22, a capacity of a signal that is transmitted by the radio unit using each CC, and a capacity of a signal received by the radio unit using each CC. In addition, the control unit a25 acquires radio quality information of each frequency band (for example, CC) measured by the mobile station apparatus m1 as control data transmitted by each mobile station apparatus m1. The control unit a25 determines a CC to be used for wireless communication with each mobile station apparatus m1 on the basis of the measurement result and the acquired radio quality information.

Next, details of the control unit a25 will be described.

Figure 5:
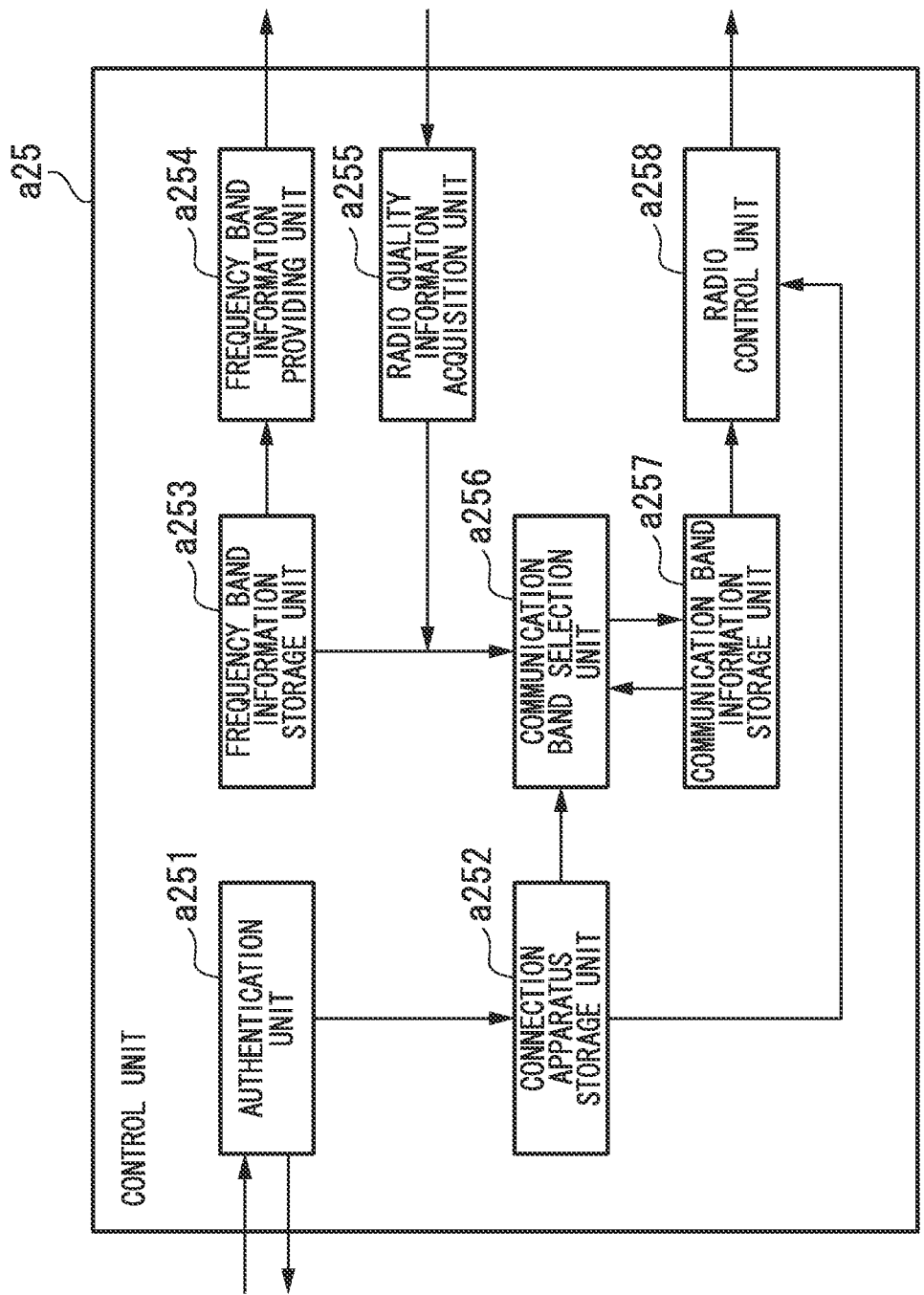
FIG. 5 is a schematic block diagram illustrating a configuration of a control unit of the femtocell base station apparatus according to this embodiment.

FIG. 5 is a schematic block diagram illustrating a configuration of the control unit a25 of the femtocell base station apparatus a2 according to this embodiment. In this drawing, the control unit a25 includes an authentication unit a251, a connection apparatus storage unit a252, a frequency band information storage unit a253, a frequency band information providing unit a254, a radio quality information acquisition unit a255, a communication band selection unit a256, a communication band information storage unit a257, and a radio control unit a258.

The authentication unit a251 pre-stores mobile station apparatus identification information such as an international mobile equipment identifier (IMEI) of the mobile station apparatus m1 permitted for the connection to its own apparatus or a phone number. The authentication unit a251 determines whether or not mobile station apparatus identification information of a connection request (or a cell change request) from the mobile station apparatus m1 is consistent with the pre-stored mobile station apparatus identification information. If the consistency is determined, the authentication unit a251 permits a connection to the mobile station apparatus. On the other hand, if inconsistency is determined, no connection to the mobile station apparatus m1 is permitted. The authentication unit a251 stores the mobile station identification information of the mobile station apparatus m1 permitted for the connection in the connection apparatus storage unit a252.

In addition, the authentication unit a251 deletes the mobile station apparatus identification information of the mobile station apparatus m1 of which the connection has been terminated from the connection apparatus storage unit a252.

The frequency band information storage unit a253 stores information regarding frequency bands of CC-1 to CC-4, information regarding whether each of CC-1 to CC-4 is the femtocell-dedicated CC or the common CC, and information regarding whether or not the CC is the priority CC if the CC is the common CC as frequency band information. In the example of FIG. 2, CC-1 is the femtocell-dedicated CC, CC-2 is the priority CC of the common CC, and the frequency band information storage unit a253 stores information indicating that CC-3 and CC-4 are common CCs other than the priority CC. In general, the femtocell-dedicated CC is common to all femtocell base station apparatus a2 (CC-1 in this embodiment).

The frequency band information providing unit a254 outputs the frequency band information stored by the frequency band information storage unit a253 to the baseband signal processing unit a22 as control data that is transmitted to the mobile station apparatus m1. The control data is arranged in a broadcast channel or a separate channel as a signal and transmitted to the mobile station apparatus m1.

The radio quality information acquisition unit a255 extracts radio quality information for each frequency band (for example, CC) measured by the mobile station apparatus m1 from control data input from the baseband signal processing unit a22. The radio quality information acquisition unit a255 outputs the extracted radio quality information to the communication band selection unit a256.

If a mobile device has moved to a femtocell, the communication band selection unit a256 selects a CC to be used for each mobile station apparatus m1 as follows, and stores information regarding the mobile station apparatus m1 and the CC selected for the mobile station apparatus m1 in the communication band information storage unit a257 as communication band information. Here, the communication band selection unit a256 selects a CC only for the mobile station apparatus m1 of the mobile station apparatus identification information stored by the connection apparatus storage unit a252, that is, the mobile communication apparatus m1 permitted for the connection.

The communication band selection unit a256 determines whether the radio quality information of the priority CC (CC-2) among pieces of radio quality information input from the radio quality information acquisition unit a255 is less or greater than a predetermined threshold value. When determining that the radio quality information is less than the predetermined threshold value (radio quality is low), the communication band selection unit a256 selects a CC of which the frequency band information stored by the frequency band information storage unit a253 is a femtocell-dedicated CC (CC-1) as an anchor carrier (the CC selected as the anchor carrier is referred to as an anchor carrier CC). On the other hand, when determining that the radio quality information is greater than the predetermined threshold value (the radio quality is high), a priority CC (CC-2) indicated by the frequency band information stored by the frequency band information storage unit a253 is selected as the anchor carrier.

If the femtocell-dedicated CC has been selected as the anchor carrier, the communication band selection unit a256 selects the femtocell-dedicated CC as a CC in which communication with the mobile station apparatus m1 is performed (the CC in which the communication with the mobile station apparatus m1 is performed is referred to as a communication CC). On the other hand, if the priority CC has been selected as the anchor carrier, the communication band selection unit a256 selects all or some of CCs (CC-1 to CC-4) available for communication by its own apparatus as communication CCs with the mobile station apparatus m1. For example, the communication band selection unit a256 determines a CC to be used for wireless communication with each mobile station apparatus m1 on the basis of the measurement result (an amount of user data) and radio quality information of each CC.

The communication band selection unit a256 stores information regarding an anchor carrier CC and a communication CC selected for each mobile station apparatus m1 in the communication band information storage unit a257 as communication band information.

The radio control unit a258 (a base station radio control unit) outputs the communication band information stored by the communication band information storage unit a257 to the baseband signal processing unit a22 as control data that is transmitted to the mobile station apparatus m1 using a CC of the communication band information for communication.

In addition, the radio control unit a258 controls the baseband signal processing unit a22 and the radio unit a23 on the basis of the communication band information stored by the communication band information storage unit a257. Specifically, the radio control unit a258 maps an incoming call notification signal, which is transmitted to the mobile station apparatus m1, to an anchor carrier CC of the communication band information. In addition, the radio control unit a258 maps a signal, which is transmitted to the mobile station apparatus m1, to a communication CC of the communication band information. In addition, the radio control unit a258 performs control for acquiring a signal received from the mobile station apparatus m1 from the communication CC of the communication band information.

For example, if the anchor carrier CC and the communication CC of the communication band information are CC-1, the radio control unit a258 maps a signal to CC-1 and acquires a signal from CC-1. In this case, communication with the mobile station apparatus m1 is performed via only the dedicated CC radio unit a231.

In addition, for example, if the anchor carrier CC of the communication band information is CC-2 and the communication CCs are CC-1 to CC-4, the radio control unit a258 maps an incoming call notification signal to CC-2. In addition, the radio control unit a258 causes signals mapped to CC-1 and CC-2 to be arranged and transmitted in the femtocell-dedicated CC in the dedicated CC radio unit c231 and the priority CC in the priority CC radio unit a232. In addition, the radio control unit a258 causes signals mapped to CC-3 and CC-4 to be arranged and transmitted in common CCs other than the priority CC in the common CC radio unit a233.

In addition, if the anchor carrier CC and the communication CC of the communication band information are the femtocell-dedicated CC in all mobile station apparatus m1, the radio control unit a258 turns off the power supply of the common CC radio unit a233 that arranges a signal in a CC other than the femtocell-dedicated CC and the priority CC, that is, a common CC other than the priority CC. Thereby, the femtocell base station apparatus a2 can reduce power consumption by its own apparatus. In addition, even in this case, if a signal is transmitted from the common CC radio unit a233, that is, if a signal is transmitted in a common CC other than the priority CC, a signal of a femtocell and a signal of a macrocell interfere with the CC, and radio quality is degraded in the mobile station apparatus m1 that communicates with the macrocell using the CC. Because the radio control unit a258 turns off the power supply of the common CC radio unit a233, the femtocell base station apparatus a2 can prevent the radio quality of the communication between the macrocell base station apparatus a1 and the mobile station apparatus m1 from being degraded without causing the interference as described above.

In addition, if there is no mobile station apparatus identification information stored by the connection apparatus storage unit a252, that is, if there is no mobile station apparatus m1 connected to its own apparatus, the radio control unit a258 turns off the power supplies of the priority CC radio unit a232 and the common CC radio unit a233. Because only a specific mobile station apparatus m1 is connected in the femtocell, a state in which no mobile station apparatus m1 is connected to the femtocell base station apparatus a2 frequently occurs. Thereby, the femtocell base station apparatus a2 can reduce power consumption by its own apparatus. In addition, the femtocell base station apparatus a2 can prevent a signal of a femtocell and a signal of a macrocell from interfering with the common CC, and prevent the radio quality of communication between the macrocell base station apparatus a1 and the mobile station apparatus m1 from being degraded. In this state, if a connection to the mobile station apparatus m1 has been established, the radio control unit a258 first applies power only to the priority CC radio unit a232. Thereafter, if the communication band selection unit a256 has selected the priority CC to the anchor carrier CC, the common CC radio unit a233 is also powered on.

Although the case in which one antenna is connected to one radio unit in the femtocell base station apparatus a2 of FIG. 4 has been described, the present invention is not limited thereto, and a plurality of antennas may be connected to one radio unit. In this case, the femtocell base station apparatus a2 may perform communication of the MIMO scheme. In addition, although the case in which signals are transmitted and received via one antenna in the femtocell base station apparatus a2 has been described, the present invention is not limited thereto. The femtocell base station apparatus a2 may include a transmitting antenna and a receiving antenna to transmit and receive signals via the transmitting antenna and the receiving antenna.

In addition, the case in which the dedicated CC radio unit a231, the priority CC radio unit a232, and the common CC radio unit a233 are provided for the femtocell-dedicated CC, the priority CC, and the common CC other than the priority CC in the femtocell base station apparatus a2 of FIG. 4, respectively, has been described above. However, the present invention is not limited thereto. A radio unit may be provided for each frequency band, and a radio unit, which performs a process in the frequency band 1, may control the arrangement of signals in the femtocell-dedicated CC and the priority CC.

<Configuration of Mobile Station Apparatus m1>

Figure 6:
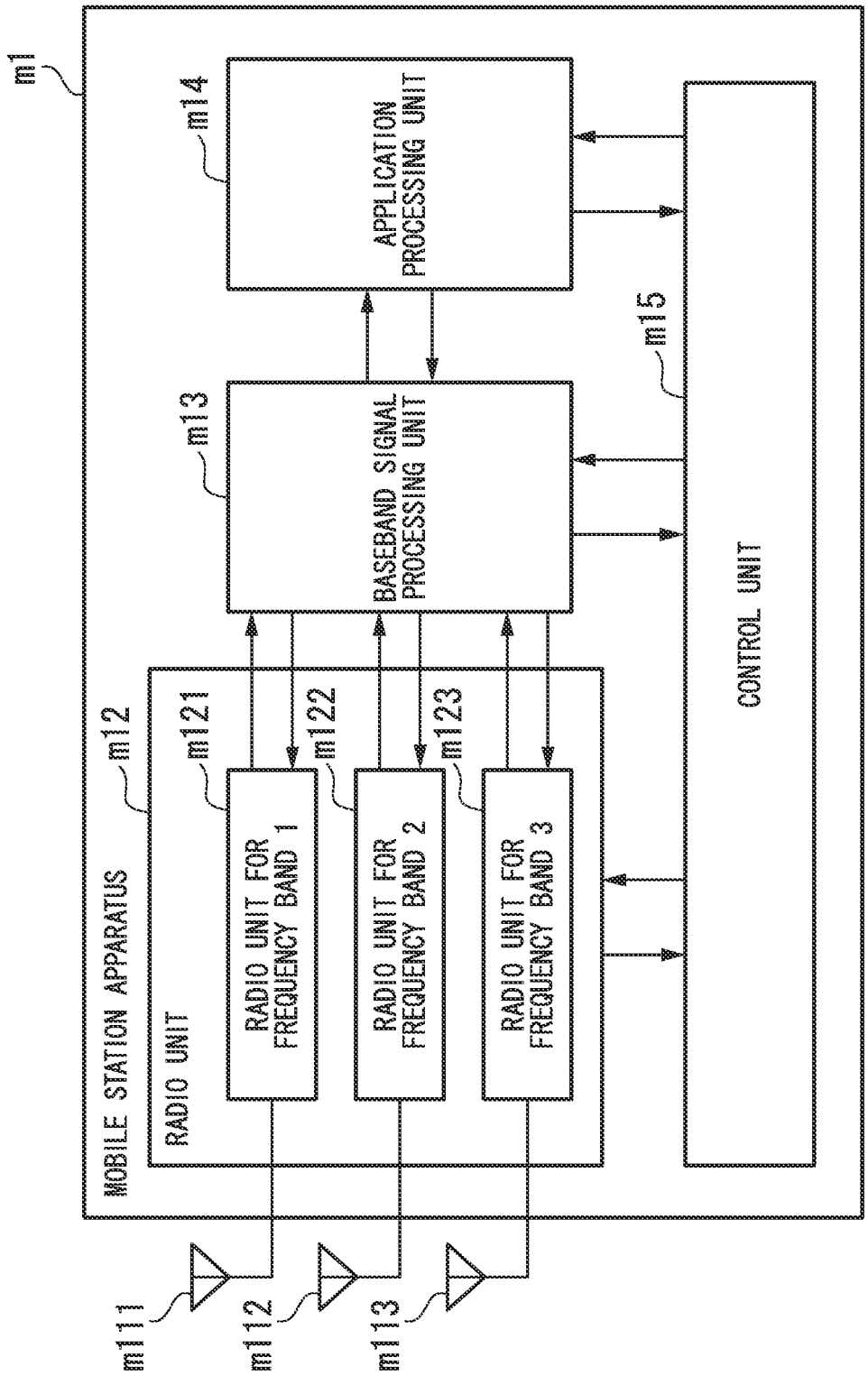
FIG. 6 is a schematic block diagram illustrating a configuration of a mobile station apparatus according to this embodiment.

FIG. 6 is a schematic block diagram illustrating a configuration of the mobile station apparatus m1 according to this embodiment. In this drawing, the mobile station apparatus m1 includes antennas m111 to m113, a radio unit m12, a baseband signal processing unit m13, an application processing unit m14, and a control unit m15. The radio unit m12 includes a radio unit m121 for the frequency band 1, a radio unit m122 for the frequency band 2, and a radio unit m123 for the frequency band 3.

The radio unit m121 for the frequency band 1 receives a signal from the macrocell base station apparatus a1 or the femtocell base station apparatus a2 via the antenna m111, and down-converts the received signal from the radio frequency band of the frequency band 1 into the baseband. The radio unit m121 for the frequency band 1 converts the down-converted signal according to analog-to-digital conversion, and outputs the converted signal to the baseband signal processing unit ni13.

In addition, the radio unit m121 for the frequency band 1 converts a signal input from the baseband signal processing unit m13 according to digital-to-analog conversion, up-converts an analog signal after the conversion from the baseband into the radio frequency band of the frequency band 1, and transmits the up-converted analog signal to the macrocell base station apparatus a1 or the femtocell base station apparatus a2 via the antenna m111.

As described above, the radio unit m121 for the frequency band 1 performs a process for the frequency band 1. For example, the radio unit m121 for the frequency band 1 arranges and transmits signals in CC-1 and CC-2 of FIG. 2, and receives signals arranged in CC-1 and CC-2.

On the other hand, the radio unit m122 for the frequency band 2 and the radio unit m123 for the frequency band 3 perform the same process as in the radio unit m121 for the frequency band 1 with respect to the frequency bands 2 and 3. For example, the radio unit m122 for the frequency band 2 arranges and transmits signals in CC-3 and CC-4 of FIG. 2, and receives signals arranged in CC-3 and CC-4. Likewise, the radio unit m123 for the frequency band 3 arranges and transmits signals in CC-5 and CC-6 of FIG. 2, and receives signals arranged in CC-5 and CC-6.

The baseband signal processing unit m13 performs a CP removal process for signals input from the radio unit m121 for the frequency band 1, the radio unit m122 for the frequency band 2, and the radio unit m123 for the frequency band 3. The baseband signal processing unit m13 performs a time-frequency transform (Fourier transform) on the signal subjected to the CP removal process. The baseband signal processing unit m13 de-maps the signal subjected to the time-frequency transform from a radio resource according to control from the control unit a15. The baseband signal processing unit m13 performs a demodulation process, a decoding process, and a descrambling process for the de-mapped signal. The baseband signal processing unit m13 divides data generated by performing these processes into control data to be used for control of wireless communication and user data excluding the control data. The baseband signal processing unit m13 outputs the control data of the divided data to the control unit m15, and outputs the user data to the application processing unit m14.

In addition, the baseband signal processing unit m13 designates data input from the application processing unit m14 as user data, and performs a scrambling process for mixing data, an encoding process, and a modulation process for the user data and the control data input from the control unit m15. According to control from the control unit m15, the baseband signal processing unit m13 maps a signal generated by performing these processes to a radio resource (time-frequency band). The baseband signal processing unit m13 performs a frequency-time transform (inverse Fourier transform) on the mapped signal. The baseband signal processing unit m13 performs a process of inserting a CP into the signal subjected to the frequency-time transform. The baseband signal processing unit m13 outputs signals arranged in the frequency bands 1, 2, and 3 among signals subjected to the CP insertion process to the radio unit m121 for the frequency band 1, the radio unit m122 for the frequency band 2, and the radio unit m123 for the frequency band 3.

The application processing unit m14 outputs user data input from the baseband signal processing unit m13 as audio or an image. In addition, the application processing unit m14 acquires input information from the user, and generates data addressed to another apparatus. The application processing unit m14 outputs the generated data to the baseband signal processing unit m13.

According to a communication protocol, the control unit m15 controls the radio unit m12, the baseband processing unit m13, and the application processing unit m14. For example, the control unit m15 performs a cell search, and consequently selects the macrocell base station apparatus a1 or the femtocell base station apparatus a2 to be connected.

In addition, for example, the control unit m15 causes various processes such as mapping, de-mapping, an encoding process, a decoding process, a modulation process, and a demodulation process to be performed using information reported from the connected macrocell base station apparatus a1 or femtocell base station apparatus a2.

In addition, the control unit m15 measures radio quality of communication, and causes radio quality information of the measurement result to be transmitted to the macrocell base station apparatus a1 or the femtocell base station apparatus a2.

Next, details of the control unit m15 will be described.

Figure 7:
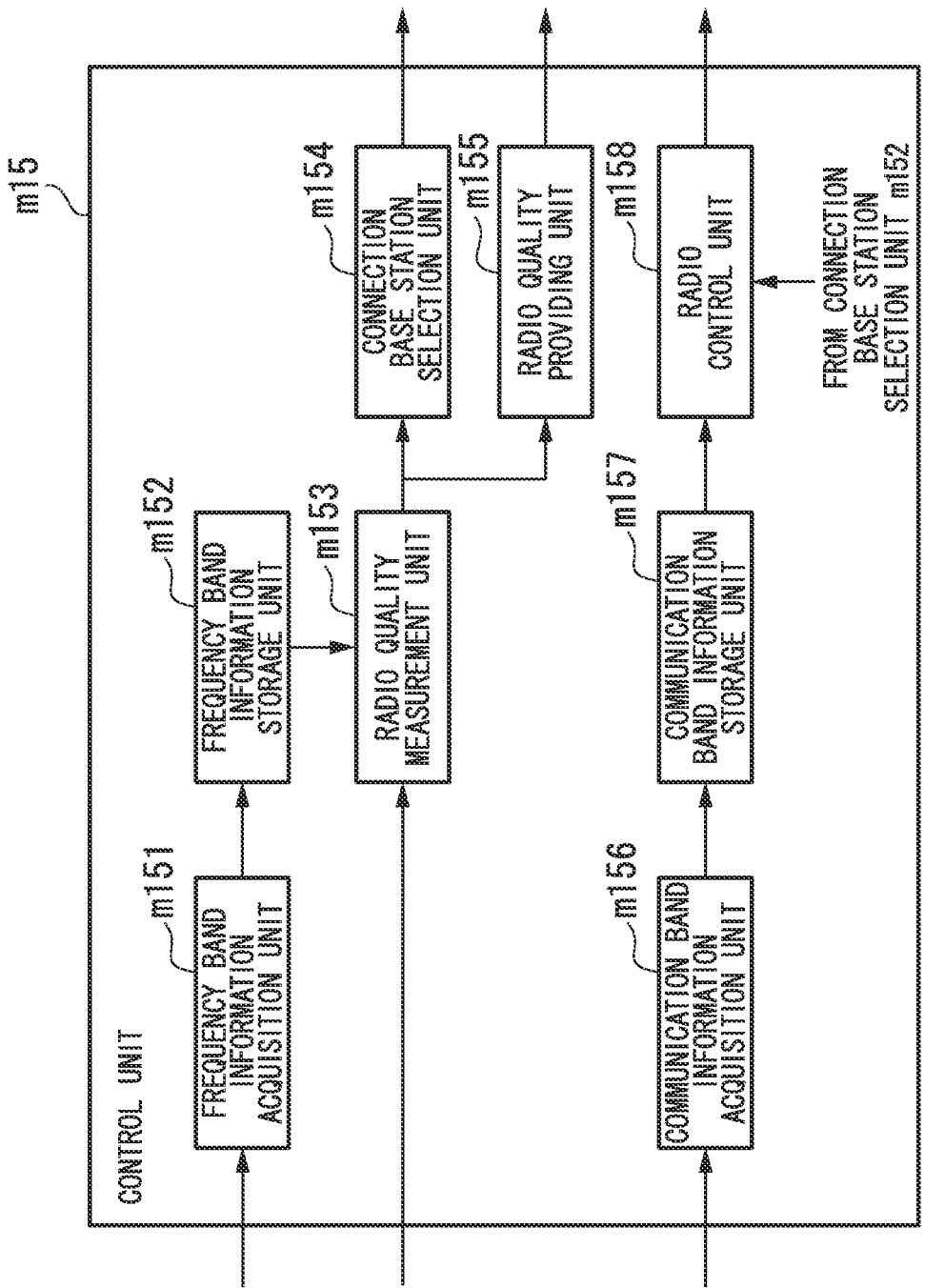
FIG. 7 is a schematic block diagram illustrating a configuration of a control unit of the mobile station apparatus according to this embodiment.

FIG. 7 is a schematic block diagram illustrating a configuration of the control unit m15 of the mobile station apparatus m1 according to this embodiment. In this drawing, the control unit m15 includes a frequency band information acquisition unit m151, a frequency band information storage unit m152, a radio quality measurement unit m153, a connection base station selection unit m154, a radio quality providing unit m155, a communication band information acquisition unit m156, a communication band information storage unit m157, and a radio control unit m158.

The frequency band information acquisition unit m151 extracts frequency band information from control data input from the baseband signal processing unit m13. The frequency band information also includes information regarding frequency bands of CC-5 and CC-6 transmitted or pre-stored by the macrocell base station apparatus a1. The frequency band information acquisition unit m151 stores the extracted frequency band information in the frequency band information storage unit m152. In addition, the frequency band information storage unit m152 stores information regarding CC-1 by designating CC-1 as a femtocell-dedicated CC in an initial state.

The radio quality measurement unit m153 periodically measures radio quality for each frequency band (for example, CC) on the basis of the frequency band information stored by the frequency band information storage unit m152. The radio quality measurement unit m153 outputs radio quality information of the measurement result to the connection base station selection unit m154 and the radio quality providing unit m155.

The connection base station selection unit m154 selects the macrocell base station apparatus a1 or the femtocell base station apparatus a2 to be connected on the basis of the radio quality information input from the radio quality measurement unit m153. Specifically, the connection base station selection unit m154 pre-stores identification information of a femtocell (referred to as femtocell identification information) of the femtocell base station apparatus a2 to be connected. The connection base station selection unit m154 extracts the femtocell identification information from a signal transmitted by the femtocell base station apparatus a2, and determines whether or not the extracted femtocell identification information is consistent with the pre-stored femtocell identification information. If the consistency is determined, the connection base station selection unit m154 outputs a connection request (or cell change request) to the baseband signal processing unit m13 as data that is transmitted to the femtocell base station apparatus a2. On the other hand, if inconsistency is determined, no connection request is output.

The radio quality providing unit m155 outputs the radio quality information input from the radio quality measurement unit m153 to the baseband signal processing unit m13 as data that is transmitted to the femtocell base station apparatus a2.

The communication band information acquisition unit m156 extracts communication band information representing information regarding a CC to be used for communication with the macrocell base station apparatus a1 or the femtocell base station apparatus a2 connected to its own apparatus from control data input from the baseband signal processing unit m13. The communication band information acquisition unit m156 stores the extracted communication band information in the communication band information storage unit m157.

The radio control unit m158 (a mobile station radio control unit) controls the baseband signal processing unit m13 and the radio unit m12 on the basis of communication band information stored by the communication band information storage unit m157. Specifically, the radio control unit m158 monitors an anchor carrier CC of the communication band information, and extracts an incoming call notification signal transmitted to the mobile station apparatus m1 from the CC.

Here, as described above, the femtocell base station apparatus a2 selects a communication anchor carrier based on the radio quality information. That is, the radio control unit m158 monitors incoming call notification by a priority CC if the radio quality of the priority CC is greater than a predetermined threshold value, and monitors the incoming call notification by a femtocell-dedicated CC if the radio quality of the priority CC is less than the predetermined threshold value.

In addition, the radio control unit m158 demodulates a signal received from the connected macrocell base station apparatus a1 or femtocell base station apparatus a2 from a communication CC of communication band information. In addition, the radio control unit m158 maps a signal to be transmitted to the connected macrocell base station apparatus a1 or femtocell base station apparatus a2 to the communication CC of the communication band information.

Here, as described above, the femtocell base station apparatus a2 selects the communication CC based on the radio quality information. That is, the radio control unit m158 controls communication with the femtocell base station apparatus a2 using the priority CC if the radio quality of the priority CC is greater than the predetermined threshold value, and controls the communication with the femtocell base station apparatus a2 using the femtocell-dedicated CC if the radio quality of the priority CC is less than the predetermined threshold value.

Although the case in which the mobile station apparatus m1 selects the femtocell base station apparatus a2 has been described above, the present invention is not limited thereto. The selection of the femtocell base station apparatus a2 may be started on the basis of an instruction from the macrocell base station apparatus a1. In this case, the mobile station apparatus m1 reports reception qualities including that of the femtocell base station apparatus a2 to the macrocell base station apparatus a1. From the reception qualities reported from the mobile station apparatus m1, the macrocell base station apparatus a1 instructs the mobile station apparatus m1 to move to a cell of the femtocell base station apparatus a2 according to control information. If the instruction is issued from the macrocell base station apparatus a1, the mobile station apparatus m1 determines whether or not the femtocell base station apparatus a2 is its own connectable base station apparatus, and performs a cell change process if the femtocell base station apparatus a2 is its own connectable base station apparatus. If the femtocell base station apparatus a2 is not its own connectable base station apparatus, the mobile station apparatus m1 can maintain the connection to the current macrocell base station apparatus a1 by reporting a cell change failure to the macrocell base station apparatus a1.

Figure 8:
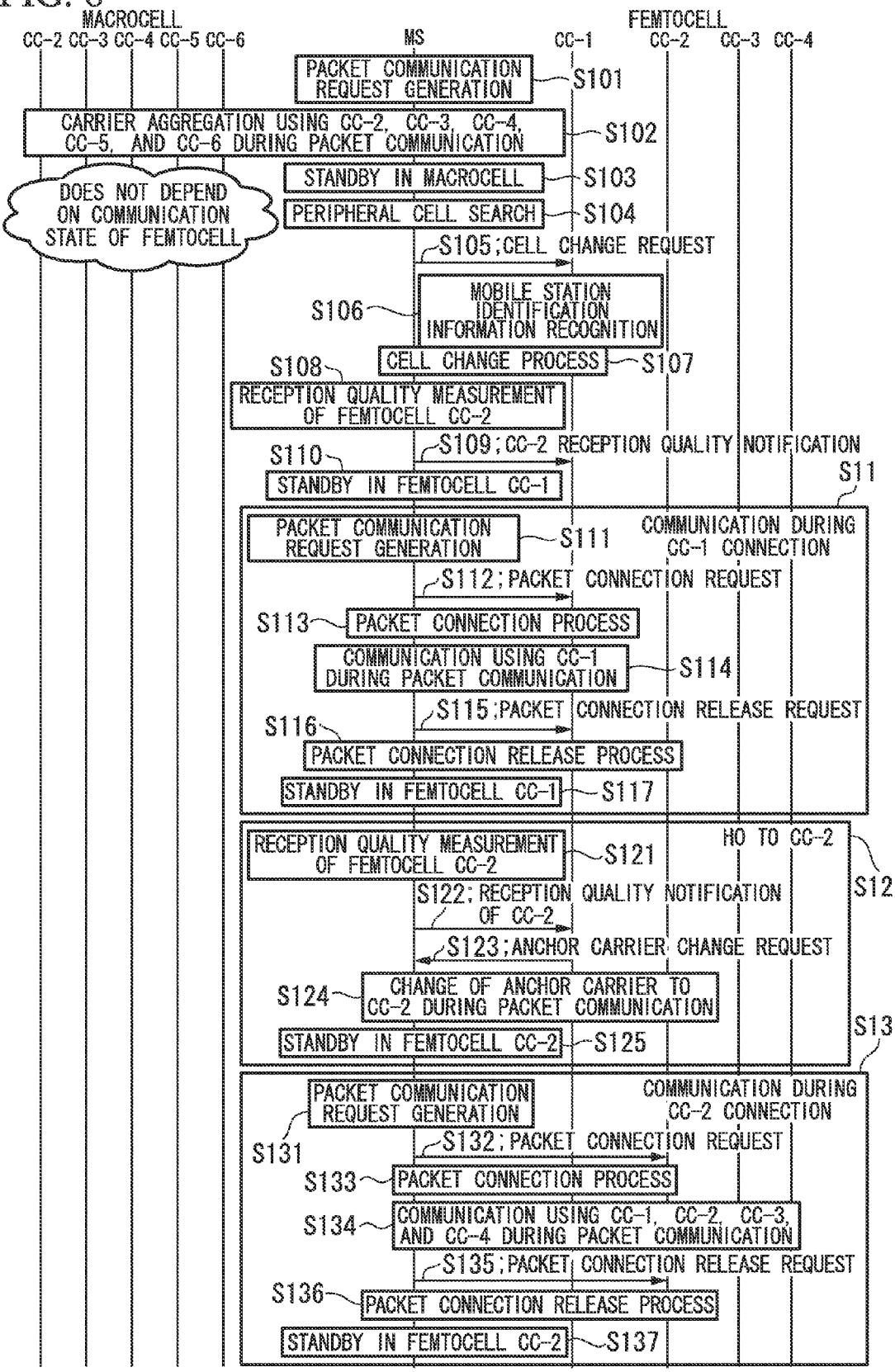
FIG. 8 is a sequence diagram illustrating an example of an operation of the wireless communication system according to this embodiment.

FIG. 8 is a sequence diagram illustrating an example of an operation of a wireless communication system according to this embodiment. This drawing illustrates an operation (cell change) in which the mobile station apparatus m1 (a mobile station (MS)) moves from a macrocell (for example, the macrocell C11 of FIG. 1) to a femtocell (for example, the femtocell C21 of FIG. 1) and operations of the mobile station apparatus m1 and the femtocell base station apparatus a2 in the femtocell. In the macrocell, the mobile station apparatus nil communicates with the macrocell base station apparatus a1 using CC-2 to CC-6 as in the example of FIG. 2. In addition, in the femtocell, the mobile station apparatus m1 communicates with the femtocell base station apparatus a2 using CC-1 to CC-4 as in the example of FIG. 2. Here, CC-1 is a femtocell-dedicated CC and CC-2 is a priority CC.

(Step S101) The mobile station apparatus m1 is connected to the macrocell base station apparatus a1. The mobile station apparatus m1 generates a packet communication request such as a browser browsing request by the user's operation. Thereafter, the process proceeds to step S102.

(Step S102) When communication of a comparatively large amount of data is performed in packet communication, the macrocell base station apparatus a1 allocates all CCs of CC-2 to CC-6 to the mobile station apparatus m1. The mobile station apparatus m1 communicates with the macrocell base station apparatus a1 using the allocated CC-2 to CC-6 (communication of CA technology). Thereafter, the process proceeds to step S103.

During the connection to the macrocell base station apparatus a1, the mobile station apparatus m1 performs communication (communication of the CA technology), regardless of a femtocell state.

(Step S103) The mobile station apparatus m1 is in a state of waiting for a signal from the macrocell base station apparatus a1 when communication has ended in step S102. Thereafter, the process proceeds to step S104.

(Step S104) The mobile station apparatus m1 measures radio qualities of peripheral cells (a macrocell and a femtocell). Here, the mobile station apparatus m1 determines the presence/absence of a signal of the femtocell in a frequency band of a femtocell-dedicated CC (CC-1). When the signal of the femtocell has been detected, the process proceeds to step S105.

(Step S105) The mobile station apparatus m1 transmits a cell change request to the femtocell base station apparatus a2 in the frequency band of the femtocell-dedicated CC (CC-1). Thereafter, the process proceeds to step S106.

(Step S106) The femtocell base station apparatus a2 determines whether or not mobile station apparatus identification information of the mobile station apparatus nil from which the cell change request has been received in step S105 is stored as mobile station apparatus identification information for permitting a connection. In the mobile station apparatus m1 based on a standard of 3GPP, a (universal) subscriber identity module ((U)SIM) card is inserted into the mobile station apparatus nil, but the (U)SIM card is preserved as the mobile station apparatus identification information. Data such as a mobile station international integrated services digital network (ISDN) number (MSISDN) (phone number), an international mobile subscriber identity (IMSI), or a temporary mobile subscriber identity (TMSI) is used. If the mobile station apparatus identification information is determined to be stored, the femtocell base station apparatus a2 permits a connection (cell change) of the mobile station apparatus m1. Thereafter, the process proceeds to step S107.

If the mobile station apparatus identification information is determined not to be stored, the femtocell base station apparatus a2 returns to a waiting state in the macrocell without permitting the connection (cell change) of the mobile station apparatus m1. Thereafter, if the communication has been generated, the process returns to step S101 (not illustrated).

(Step S107) The mobile station apparatus m1 performs a process (cell change process) of connecting to the femtocell base station apparatus a2. Thereafter, the process proceeds to step S108.

(Step S108) The mobile station apparatus m1 designates CC-1 as an anchor carrier CC, and acquires frequency band information transmitted by the femtocell base station apparatus a2 from CC-1. In the frequency band information, information (CC-2) indicating the priority CC is included. The mobile station apparatus m1 periodically measures radio quality of the priority CC, and transmits radio quality information to the femtocell base station apparatus a2 as the measurement result. Thereafter, the process proceeds to step S109.

(Step S109) The femtocell base station apparatus a2 determines whether the radio quality information transmitted in step S108 is less or greater than the predetermined threshold value. If the radio quality information is determined to be less than the predetermined threshold value, the mobile station apparatus m1 is in a state of waiting for a signal from the femtocell base station apparatus a2 by directly designating CC-1 as the anchor carrier CC. Thereafter, the process proceeds to step S111.

If the radio quality information is determined to be greater than the predetermined threshold value, the process proceeds to step S12.

Step S11 (steps S111 to S117) is a part indicating an operation in which the mobile station apparatus m1 communicates with the femtocell base station apparatus a2 if the anchor carrier CC is CC-1.

(Step S111) The mobile station apparatus m1 generates a packet communication request such as a browser browsing request by the user's operation. Thereafter, the process proceeds to step S112.

(Step S112) The mobile station apparatus m1 transmits a packet connection request for requesting communication packet transmission/reception to the femtocell base station apparatus a2 using CC-1, which is an anchor carrier CC. Thereafter, the process proceeds to step S113.

(Step S113) The femtocell base station apparatus a2 performs a connection (referred to as packet connection) process for a communication packet transmission/reception process. Thereafter, the process proceeds to step S114.

(Step S114) The mobile station apparatus m1 transmits/receives a communication packet by communicating with the femtocell base station apparatus a2 using CC-1. Thereafter, the process proceeds to step S115.

(Step S115) When the communication has been completed in step S114, the mobile station apparatus m1 transmits a packet connection release request for requesting a packet connection release to the femtocell base station apparatus a2. Thereafter, the process proceeds to step S116.

(Step S116) The femtocell base station apparatus a2 performs a process of releasing a packet connection (a packet connection release process). Thereafter, the process proceeds to step S117.

(Step S117) The mobile station apparatus m1 is in a state of waiting for a signal from the femtocell base station apparatus a2 in an anchor carrier CC (CC-1). Thereafter, if radio quality of CC-2 is determined to be greater than the predetermined threshold value, the process proceeds to step S121. If the radio quality of CC-2 is determined to be less than the predetermined threshold value, the process of S11 is performed every time communication is generated.

Step S12 (steps S121 to S125) is a part indicating an operation when the anchor carrier CC is changed to a priority CC (handover (HO)).

(Step S121) The mobile station apparatus m1 periodically measures radio quality of the priority CC. Thereafter, the process proceeds to step S122.

(Step S122) Radio quality information is transmitted to the femtocell base station apparatus a2 as the measurement result in step S122. Thereafter, the process proceeds to step S113.

(Step S123) If the radio quality information transmitted in step S121 is determined to be greater than the predetermined threshold value, the femtocell base station apparatus a2 selects the priority CC (CC-2) as the anchor carrier CC. The femtocell base station apparatus a2 transmits communication band information (an anchor carrier change request) in which CC-2 is designated as the anchor carrier CC to the mobile station apparatus m1.

(Step S124) The mobile station apparatus m1 changes the anchor carrier CC from CC-1 to CC-2. Thereafter, the process proceeds to step S125.

(Step S125) The mobile station apparatus m1 is in a state of waiting for a signal from the femtocell base station apparatus a2 by designating CC-2 as the anchor carrier CC. Thereafter, the process proceeds to step S131.

Step 13 (steps S131 to S137) is a part indicating an operation when the mobile station apparatus m1 communicates with the femtocell base station apparatus a2 when the anchor carrier CC is CC-2.

(Step S131) The mobile station apparatus m1 generates a packet communication request such as a browser browsing request by the user's operation. Thereafter, the process proceeds to step S132.

(Step S132) The mobile station apparatus m1 transmits a packet connection request for requesting communication packet transmission/reception using CC-2, which is the anchor carrier CC, to the femtocell base station apparatus a2. Thereafter, the process proceeds to step S133.

(Step S133) The femtocell base station apparatus a2 performs a packet connection process. Thereafter, the process proceeds to step S134.

(Step S134) The mobile station apparatus m1 transmits/receives a communication packet by communicating with the femtocell base station apparatus a2 (communication of CA technology) using communication CCs including a common CC. Here, the mobile station apparatus m1 measures radio qualities of CC-1 to CC-4, and transmits the radio qualities of CC-1 to CC-4 as the measurement result to the femtocell base station apparatus a2. The measurement and the transmission of the measurement result are periodically performed. The femtocell base station apparatus a2 determines communication CCs (CC-1 to CC-4 in the example of FIG. 8) to be used for wireless communication with the mobile station apparatus m1 on the basis of the transmitted radio quality information regarding each CC and an amount of user data. Thereafter, the process proceeds to step S135.

(Step S135) If communication has been completed in step S134, the mobile station apparatus m1 transmits a packet connection release request to the femtocell base station apparatus a2. Thereafter, the process proceeds to step S136.

The mobile station apparatus m1 acquires a signal of a physical downlink control channel (PDCCH) by which mapping of a reception signal is indicated. Here, the PDCCH may be arranged in each CC or a specific CC. An arrangement of PDCCHs to be transmitted is predetermined, and the mobile station apparatus m1 receives PDCCHs of all CCs in which the PDCCHs are likely to be received. If the PDCCH addressed to its own apparatus is not transmitted, the mobile station apparatus m1 receives the next PDCCH without receiving a physical downlink shared channel (PDSCH). When scheduling data addressed to its own apparatus has been received on the PDCCH, the mobile station apparatus m1 acquires a signal of user data transmitted from the femtocell base station apparatus a2 from a resource block according to mapping indicated by the PDCCH. The mobile station apparatus m1 performs a demodulation process by combining the acquired signal of the user data, and displays the user data by a browser or the like.

(Step S136) The femtocell base station apparatus a2 performs a packet connection release process. Thereafter, the process proceeds to step S137.

(Step S137) The mobile station apparatus m1 is in a state of waiting for a signal from the femtocell base station apparatus a2 in an anchor carrier CC (CC-2). Thereafter, if communication has been generated, the process of S13 is iterated. In addition, the radio quality of CC-2 is degraded and less than the predetermined threshold value, a process of HO to CC-1 is performed in the same procedure as the procedure shown in S12, and the process is in a waiting state for CC-1.

A communication function of the femtocell base station apparatus a2 has been described with reference to FIG. 8.

As described above, the femtocell base station apparatus a2 specifies a frequency band of which the radio quality is monitored according to a connection state of the mobile station apparatus m1. Thus, it is possible to stop a function of an unnecessary radio unit (for example, the common CC radio unit a233) according to the connection state of the mobile station apparatus m1. Thereby, the femtocell base station apparatus a2 can reduce power consumption. In addition, the femtocell base station apparatus a2 can prevent the radio quality of communication between the macrocell base station apparatus a1 and the mobile station apparatus m1 from being degraded without causing interference as described above by turning off the power supply of the unnecessary radio unit.

Figure 9:
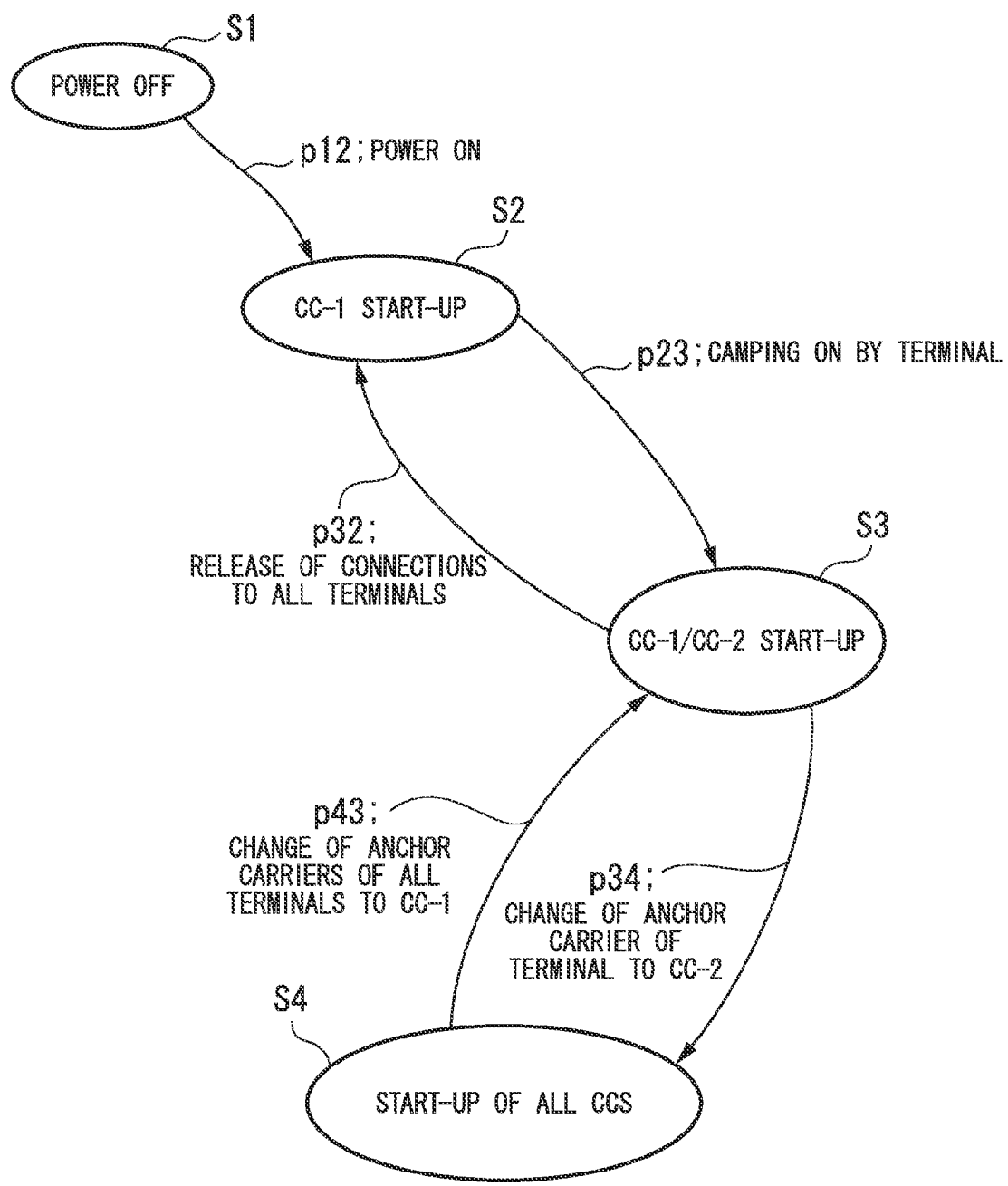
FIG. 9 is a schematic diagram illustrating a state transition of power control in the femtocell base station apparatus according to this embodiment.

FIG. 9 is a schematic diagram illustrating a state transition of power control in the femtocell base station apparatus a2 according to this embodiment. This drawing illustrates the case in which the femtocell-dedicated CC is CC-1 and the priority CC is CC-2.

A state S1 to which reference numeral S1 is affixed is a state (power OFF) in which the power supply of the femtocell base station apparatus a2 is turned off. A state S2 to which reference numeral S2 is affixed is a state in which the power supply of a radio unit (the dedicated CC radio unit a231 of FIG. 4) for performing a process for CC-1, which is the femtocell-dedicated CC, is turned on (CC-1 start-up). A state S3 to which reference numeral 3 is affixed is a state in which the power supply of a radio unit (the priority CC radio unit a232) for performing a process for CC-2, which is the priority CC, is turned on (CC-1/CC-2 start-up). A state S4 to which reference numeral 4 is affixed is a state in which the power supply of a radio unit (the common CC radio unit a233) for performing a process for a common CC other than the priority CC is turned on (start-up of all CCs). The powered-on radio unit transmits a signal such as a control signal in a CC for which a process is performed.

During the state S1, if the power supply of the femtocell base station apparatus a2 is turned on, the femtocell base station apparatus a2 transitions to the state S2 (p12). The state S2 becomes a state in which only the power supply of the dedicated CC radio unit a2321 is turned on and the power supplies of the priority CC radio unit a232 and the common CC radio unit a233 are turned off. Because the mobile station apparatus m1 detects a signal of the femtocell base station apparatus a2 in the femtocell-dedicated CC-1, the mobile station apparatus m1 can detect the femtocell base station apparatus a2 if the femtocell base station apparatus a2 transmits a signal by turning on only the power supply of the dedicated CC radio unit a231.

During the state S2, if the femtocell base station apparatus a2 has received a connection request from the mobile station apparatus m1, that is, if the mobile station apparatus m1 connected to the macrocell is connected to (camped on) a femtocell, the femtocell base station apparatus a2 transitions to the state S3 (S23). In the state S3, because the femtocell base station apparatus a2 transmits a signal by turning on the power supply of the common CC radio unit a233, the mobile station apparatus m1 can measure radio quality in the priority CC (CC-2). Because a signal of the macrocell and a signal of the femtocell interfere with the priority CC, the mobile station apparatus m1 can measure a signal interference situation.

During the state S3, if the mobile station apparatus m1 connected to the femtocell base station apparatus a2 has moved to the macrocell or if the femtocell base station apparatus a2 determines that there is no mobile station apparatus m1 connected to its own apparatus due to the power off of the connected mobile station apparatus m1, the femtocell base station apparatus a2 transitions to the state S2 (p32).

On the other hand, during the state S3, if the femtocell base station apparatus a2 selects the priority CC as the anchor carrier CC of the mobile station apparatus m1 (if radio quality of the priority CC is low), that is, if the anchor carrier of the mobile station apparatus m1 is changed to the priority CC from the femtocell-dedicated CC, the femtocell base station apparatus a2 transitions to the state S4 (p34). Although common CCs other than the priority CC are not used if all mobile station apparatus m1 are in the waiting state in the state S4, the femtocell base station apparatus a2 turns on the power supply of the common CC radio unit a233 because radio qualities of the CCs are periodically measured in preparation for the case in which communication is generated.

During the state S4, if the femtocell base station apparatus a2 selects the femtocell-dedicated CC as the anchor carriers CCs of all the connected mobile station apparatus m1 (if the radio quality of the priority CC is high), that is, if the anchor carrier of the mobile station apparatus m1 is changed from the priority CC to the femtocell-dedicated CC, the femtocell base station apparatus a2 transitions to the state S3 (p43).

The femtocell base station apparatus a2 can perform power control of each radio unit on the basis of the anchor carrier CC of the connected mobile station apparatus m1 by performing a state transition process as described above.

Hereinafter, the case in which signal interference in the common CC is reduced due to movement of another mobile station apparatus m1 connected to the macrocell (the radio quality of the common CC is improved) and a change to communication using the common CC (communication of CA technology) is also made if the mobile station apparatus m1 and the femtocell base station apparatus a2 perform communication using only the femtocell-dedicated CC (for example, step S114 of FIG. 8) will be described.

Figure 10:
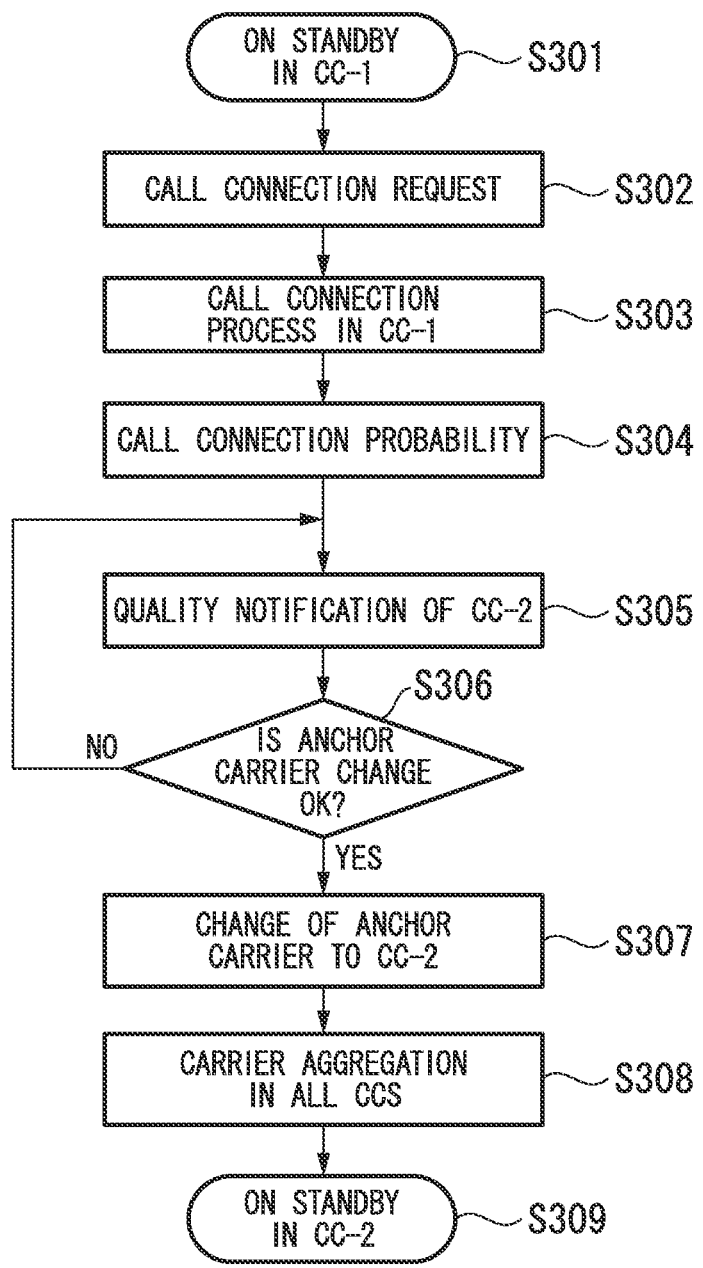
FIG. 10 is a flowchart illustrating an example of an operation of the mobile station apparatus according to this embodiment.

FIG. 10 is a flowchart illustrating an example of an operation of the mobile station apparatus m1 according to this embodiment.

(Step S301) The mobile station apparatus m1 is in a state of waiting for a signal from the femtocell base station apparatus a2 by designating CC-1 as the anchor carrier CC. Thereafter, the process proceeds to step S302.

(Step S302) The mobile station apparatus m1 generates a packet communication request such as a browser browsing request by the user's operation. The mobile station apparatus m1 transmits a packet connection request for requesting communication packet transmission/reception using CC-1, which is an anchor carrier CC, to the femtocell base station apparatus a2. Thereafter, the process proceeds to step S303.

(Step S303) The mobile station apparatus nil performs a packet connection process with the femtocell base station apparatus a2. Thereafter, the process proceeds to step S304.

(Step S304) The mobile station apparatus m1 establishes a packet connection, and performs a process of transmitting/receiving a communication packet using CC-1. Because communication is performed using only CC-1 in this state, user data is provided at a limited data transmission speed. Thereafter, the process proceeds to step S305.

(Step S305) Even when the communication packet transmission/reception process is performed, the mobile station apparatus m1 periodically measures the radio quality of the priority CC, and transmits radio quality information to the femtocell base station apparatus a2 as the measurement result. Thereafter, the process proceeds to steps S306.

(Step S306) The mobile station apparatus m1 receives information regarding an anchor carrier CC selected by the femtocell base station apparatus a2 as communication band information on the basis of the radio quality information transmitted in step S305. When the anchor carrier CC of the received communication band information is determined to be CC-1 (No), the mobile station apparatus m1 returns to step S305. On the other hand, if the anchor carrier CC of the received communication band information is determined to be CC-2 (an anchor carrier change request) (Yes), the mobile station apparatus m1 returns to step S307.

(Step S307) The mobile station apparatus m1 changes the anchor carrier CC from CC-1 to CC-2. Thereafter, the process proceeds to step S308.

(Step S308) The mobile station apparatus m1 transmits/receives a communication packet by communicating with the femtocell base station apparatus a2 (communication of the CA technology) using communication CCs including a common CC (all CCs in FIG. 10). Because a transmission rate of data is not limited, communication is performed using all the CCs in this case, and thus user data is provided by high-speed communication having a high data rate. Thereafter, the process proceeds to step S309.

(Step S309) Because an anchor carrier change process is completed during communication when the communication of step S308 has ended, the mobile station apparatus m1 is in a state of waiting for a signal from the femtocell base station apparatus a2 in the anchor carrier CC (CC-2).

The case in which signal interference in a common CC is degraded (radio quality of the common CC is improved) and a change to communication using the common CC is also made when the mobile station apparatus m1 and the femtocell base station apparatus a2 perform communication using only a femtocell-dedicated CC has been described with reference to FIG. 10. In contrast, when the femtocell base station apparatus a2 performs communication using the common CC, interference from the macrocell is increased (the radio quality of the common CC is degraded) and a change to communication using only the femtocell-dedicated CC is made.

As described above, according to this embodiment, the femtocell base station apparatus a2 selects the common CC as a CC to be used for communication with the mobile station apparatus m1 if the radio quality of the priority CC is greater than the predetermined threshold value in the mobile station apparatus m1, and selects the femtocell-dedicated CC as a CC to be used for communication with the mobile station apparatus m1 if the radio quality of the priority CC is less than the predetermined threshold value in the mobile station apparatus m1. In addition, the mobile station apparatus m1 controls communication with the femtocell base station apparatus a2 using the common CC if the radio quality of the priority CC is greater than the predetermined threshold value, and controls communication with the femtocell base station apparatus a2 using the femtocell-dedicated CC if the radio quality of the priority CC is less than the predetermined threshold value.

Thereby, in this embodiment, if the interference of the macrocell base station apparatus a1 is small in the common CC between the femtocell base station apparatus a2 and the mobile station apparatus m1 (if the radio quality of the common CC is high), the mobile station apparatus m1 can stably communicate with the femtocell base station apparatus a2 at a high speed in communication using a plurality of CCs including the common CC (communication of the CA technology).

In addition, if the interference of the macrocell base station apparatus a1 is large in the common CC between the femtocell base station apparatus a2 and the mobile station apparatus m1 (if the radio quality of the common CC is low), the mobile station apparatus m1 can stably communicate with the femtocell base station apparatus a2 in communication using a femtocell-dedicated CC. That is, even when interference is caused due to a signal from the macrocell base station apparatus a1 in a part of a frequency band used in communication, the mobile station apparatus m1 can stably communicate with the femtocell base station apparatus a2.

In addition, according to this embodiment, the mobile station apparatus m1 establishes a connection to the femtocell base station apparatus a2 using the femtocell-dedicated CC if a signal is detected in the femtocell-dedicated CC when no connection to the femtocell base station apparatus a2 is established. Thereby, in this embodiment, the mobile station apparatus m1 can perform a connection process using the femtocell-dedicated CC that is not affected by interference from a signal of the macrocell, and the mobile station apparatus m1 can be reliably connected to the femtocell base station apparatus a2.

In addition, according to this embodiment, for the femtocell base station apparatus a2, the mobile station apparatus m1 selects a part of the priority CC as an anchor carrier for monitoring incoming call notification if the radio quality of the priority CC in the mobile station apparatus m1 is greater than the predetermined threshold value, and the mobile station apparatus m1 selects the femtocell-dedicated CC as the anchor carrier for monitoring the incoming call notification if the radio quality of the priority CC in the mobile station apparatus m1 is less than the predetermined threshold value. In addition, the mobile station apparatus m1 monitors the incoming call notification in the priority CC if the radio quality of the priority CC is greater than the predetermined threshold value, and monitors the incoming call notification in the femtocell-dedicated CC if the radio quality of the priority CC is less than the predetermined threshold value.

Thereby, in this embodiment, the femtocell base station apparatus a2 and the mobile station apparatus m1 can make selection so that communication of the CA technology is performed when the anchor carrier to be monitored by the mobile station apparatus m1 is the priority CC and no communication of the CA technology is performed when the anchor carrier to be monitored by the mobile station apparatus m1 is the femtocell-dedicated CC. That is, it is possible to select whether or not to perform the communication of the CA technology on the basis of information regarding the anchor carrier to be monitored by the mobile station apparatus m1.

In addition, according to this embodiment, the mobile station apparatus nil measures the priority CC, and the femtocell base station apparatus a2 determines a communication CC based on radio quality of the priority CC. Thereby, the mobile station apparatus m1 can select the communication CC by measuring radio quality of only one CC, and reduce a process of measuring radio quality as compared to the case in which radio qualities of two or more common CCs are measured.

In addition, according to this embodiment, the femtocell base station apparatus a2 controls stopping of a signal that is transmitted in a common CC if all mobile station apparatus m1 are not connected. Thereby, in this embodiment, the femtocell base station apparatus a2 can reduce power consumption to be used for control of the common CC.

In addition, according to this embodiment, the femtocell base station apparatus a2 controls stopping of a signal that is transmitted in a common CC other than the priority CC if only the femtocell-dedicated CC is selected as the communication CC to be used for communication with the mobile station apparatus m1. Thereby, in this embodiment, the femtocell base station apparatus a2 can reduce power consumption to be used for control of CCs other than the priority CC.

In addition, if interference from the macrocell is large in the common CC (if the radio quality of the common CC is low), a connection destination may be switched to the macrocell. However, a communication fee occurring in communication may be different between the femtocell and the macrocell (the communication fee of communication in the macrocell is higher). Consequently, it is not preferable for the connected base station apparatus to be switched between the macrocell base station apparatus a1 and the femtocell base station apparatus a2. In addition, when switching of the base station apparatus is generated, data transmission may be disconnected in the middle and the load of a data transmission process may be caused.

According to this embodiment, because the mobile station apparatus m1 connected to the femtocell is continuously connected to the femtocell, it is possible to prevent the switching of the base station apparatus from being generated and prevent a change in a communication fee or load of a process occurring in switching.

Figure 11:
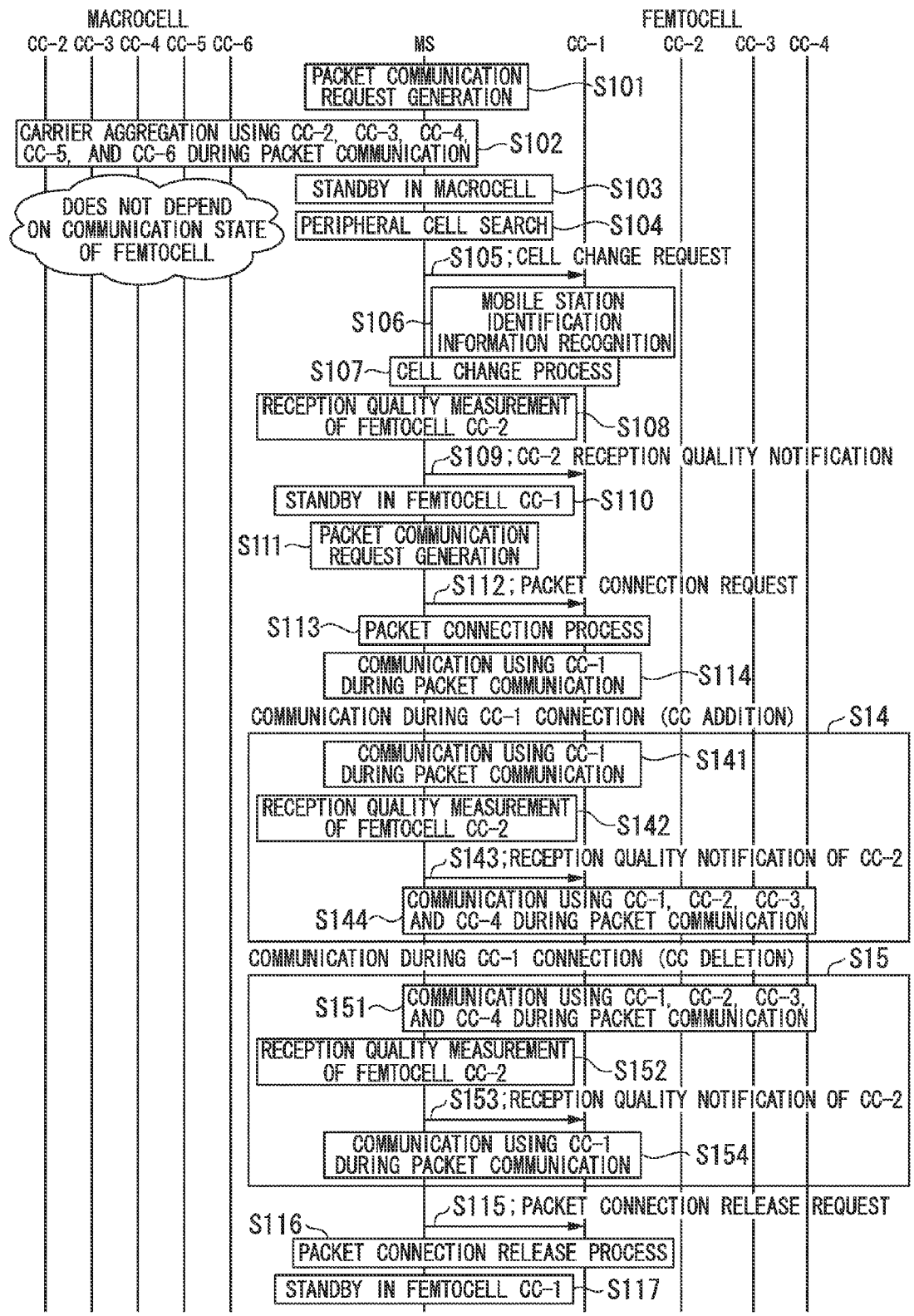
FIG. 11 is another sequence diagram illustrating an example of the operation of the wireless communication system according to this embodiment.

FIG. 11 is another sequence diagram illustrating an example of an operation of a wireless communication system according to this embodiment. FIG. 11 is a diagram illustrating details of an example of a process between steps S114 and S115 in FIG. 8. Because the process of steps S101 to S114 and S115 to S117 is the same in FIG. 11 and FIG. 8, description thereof is omitted.

After step S108 of FIG. 8, as described above, the mobile station apparatus m1 periodically measures radio quality of the priority CC, and transmits radio quality information to the femtocell base station apparatus a2 as the measurement result.

(Step S141) The femtocell base station apparatus a2 (the communication band selection unit a256) determines whether the radio quality information of the priority CC transmitted from the mobile station apparatus m1 is less or greater than the predetermined threshold value. In the example of FIG. 11, the femtocell base station apparatus a2 determines that the radio quality information is less than the predetermined threshold value, and the mobile station apparatus m1 transmits/receives a communication packet by directly communicating with the femtocell base station apparatus a2 using CC-1. Thereafter, the process proceeds to step S142.

(Step S142) The mobile station apparatus m1 measures the radio quality of the priority CC, and transmits the radio quality information to the femtocell base station apparatus a2 as the measurement result. Thereafter, the process proceeds to step S143.

(Step S143) The femtocell base station apparatus a2 determines whether the radio quality information transmitted from the mobile station apparatus m1 is less or greater than the predetermined threshold value. In the example of FIG. 11, the femtocell base station apparatus a2 determines that the radio quality information is greater than the predetermined threshold value (determines that the common CC is available), and sets CCs to be used for communication to CC-1 to CC-4. Thereafter, the process proceeds to step S144.

The femtocell base station apparatus a2 may set communication CCs to be used for wireless communication with the mobile station apparatus m1 to some of CC-1 to CC-4 on the basis of radio quality information of each CC and a data mount of user data.

(Step S144) The mobile station apparatus m1 transmits/receives a communication packet by communicating with the femtocell base station apparatus a2 using CC-1 to CC-4. If the communication CCs are set to some of CC-1 to CC-4 in step S143, transmission/reception is performed using the determined communication CCs. Thereafter, the process proceeds to step S151.

(Step S151) The femtocell base station apparatus a2 determines whether the radio quality information transmitted from the mobile station apparatus m1 is less or greater than the predetermined threshold value. In the example of FIG. 11, the femtocell base station apparatus a2 determines that the radio quality information is greater than the predetermined threshold value, and transmits/receives a communication packet by directly communicating with the femtocell base station apparatus a2 using CC-1 to CC-4. Thereafter, the process proceeds to step S152.

(Step S152) The mobile station apparatus m1 measures radio quality of the priority CC, and transmits radio quality information to the femtocell base station apparatus a2 as the measurement result. Thereafter, the process proceeds to step S153.

(Step S153) The femtocell base station apparatus a2 determines whether the radio quality information transmitted from the mobile station apparatus m1 is less or greater than the predetermined threshold value. In the example of FIG. 11, the femtocell base station apparatus a2 determines that the radio quality information is less than the predetermined threshold value (determines that no common CC is available), and sets a CC to be used for communication to CC-1. The threshold value used in step S153 may be identical with or different from the threshold value used in another process (for example, step S141) (may be greater or less than the threshold value used in the other process). The mobile station apparatus m1 may periodically measure the radio quality of the priority CC, and transmit the radio quality information to the femtocell base station apparatus a2 as the measurement result if the measured radio quality is less than the predetermined threshold value.

(Step S154) The mobile station apparatus m1 stops communication using CC-2 to CC-4, and transmits/receives a communication packet by communicating with the femtocell base station apparatus a2 using only CC-1. Here, the femtocell base station apparatus a2 and the mobile station apparatus m1 stop signal transmission in a common CC other than the priority CC to be used for measurement of radio quality. That is, when communication with the mobile station apparatus m1 is performed in only a dedicated CC, communication in a common CC other than the priority CC to be used for measurement of radio quality as a part of a common CC is stopped. Thereafter, the process proceeds to step S115.

According to the above process of steps S14 (steps S141 to S144) and S15 (steps S151 to S154), the femtocell base station apparatus a2 and the mobile station apparatus m1 can perform stable communication even during communication.

(Second Embodiment)

Hereinafter, the second embodiment of the present invention will be described in detail with reference to the drawings. In this embodiment, the mobile station apparatus performs communication of a time division duplex (TDD) scheme in a femtocell-dedicated CC (dedicated frequency band), and performs communication of a frequency division duplex (FDD) scheme in a common CC (common frequency band). Because a schematic diagram illustrating a wireless communication system according to this embodiment is the same as in FIG. 1, description thereof is omitted.

Figure 12:
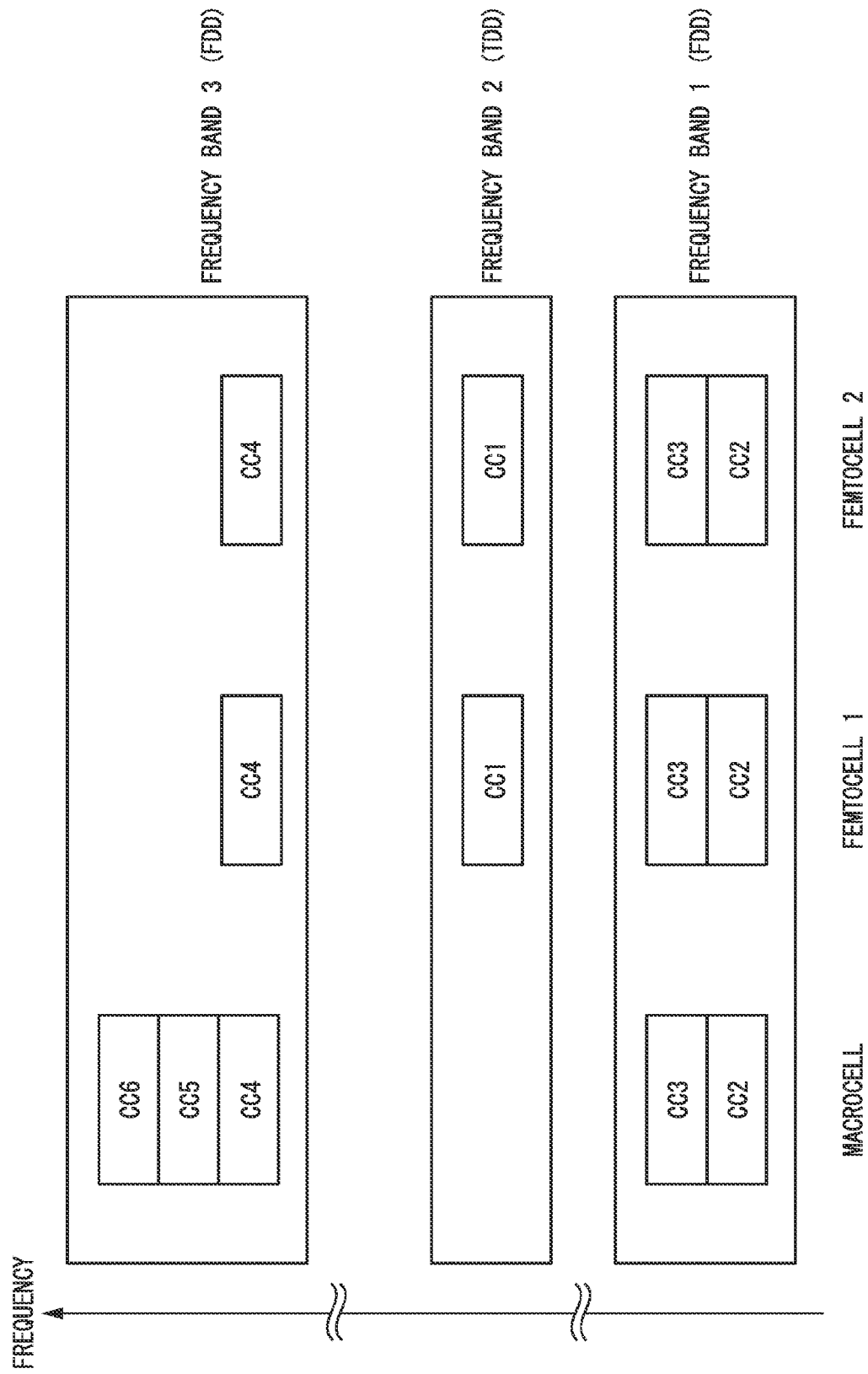
FIG. 12 is a schematic diagram illustrating an example of CC allocation according to a second embodiment of the present invention.

FIG. 12 is a schematic diagram illustrating an example of CC allocation according to the second embodiment of the present invention. In this drawing, the vertical axis is frequency and CC allocation for each base station apparatus is illustrated (on the horizontal axis).

In FIG. 12, the frequency is divided into three frequency bands (frequency bands 1, 2, and 3 in ascending order of frequency). These frequency bands are, for example, frequency bands such as bands of 800 MHz, 1.5 GHz, 2 GHz, and 3 GHz. In addition, a plurality of frequency bands are provided in each frequency band. This frequency band is, for example, a carrier of a maximum of 20 MHz. Each apparatus performs communication of the FDD scheme in the frequency bands 1 and 3, and performs communication of the TDD scheme in the frequency band 2.

As illustrated in FIG. 12, in the macrocell C11, communication of the FDD scheme can be performed using the frequency bands 1 and 3, and communication can be performed using five CCs of CC-2 to CC-6. CC-1 is used in the femtocells C21 and C22 and not used in the macrocell C11. That is, CC-1 is a femtocell-dedicated CC, and communication of the TDD scheme is performed in CC-1.

In addition, as illustrated in FIG. 12, communication can be performed using the frequency bands 1, 2, and 3 in the femtocells C21 and C22, and communication can be performed using four CCs of CC-1 to CC-4. CC-2 is a priority CC.

Hereinafter, the macrocell base station apparatus A11 is referred to as a macrocell base station apparatus a1, each of the femtocell base station apparatus A21 and A22 is referred to as a femtocell base station apparatus a3, and each of the mobile station apparatus M10 to M12 is referred to as a mobile station apparatus m2. Because the configuration of the macrocell base station apparatus a1 is the same as the configuration illustrated in the drawing (FIG. 1) of the first embodiment, description thereof is omitted.

<Configuration of Femtocell Base Station Apparatus a3>

Figure 13:
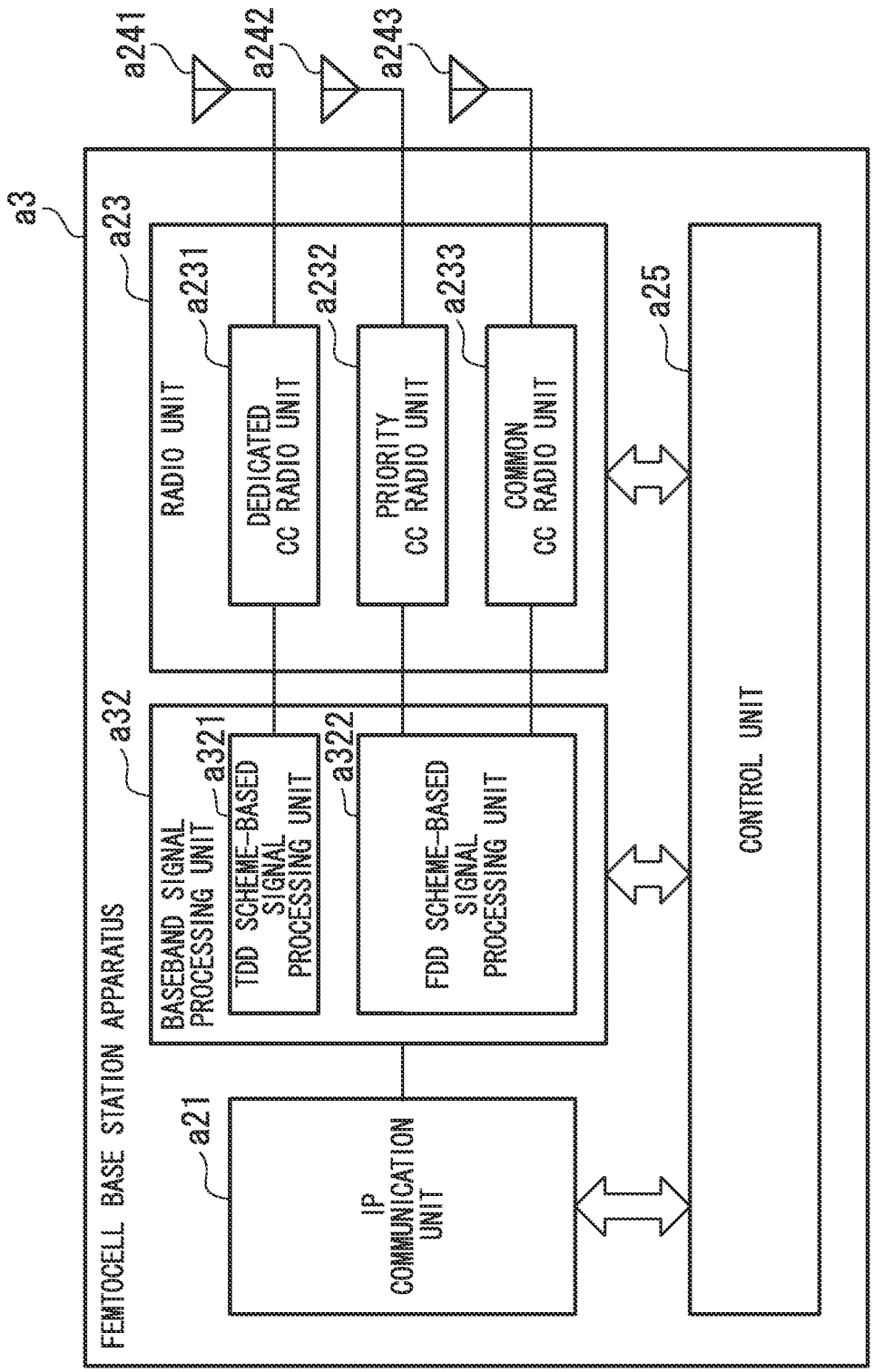
FIG. 13 is a schematic block diagram illustrating a configuration of a femtocell base station apparatus according to this embodiment.

FIG. 13 is a schematic block diagram illustrating a configuration of the femtocell base station apparatus a3 according to this embodiment. The femtocell base station apparatus a3 according to this embodiment includes a baseband processing unit a32 as an example of details of the baseband signal processing unit a22 in FIG. 4. Because functions provided in other configurations (an IP communication unit a21, a radio unit a23, antennas a241 to a243, and a control unit a25) are the same as in the first embodiment (FIG. 4), description thereof is omitted.

The baseband signal processing unit a32 includes a TDD scheme-based signal processing unit a321 and an FDD scheme-based signal processing unit a322.

The TDD scheme-based signal processing unit a321 performs the same process as the baseband signal processing unit a22 for data that is transmitted in a dedicated CC (CC-1). Here, the TDD scheme-based signal processing unit a321 maps uplink data according to a signal format of the TDD scheme. The TDD scheme-based signal processing unit a321 outputs a signal arranged in the femtocell-dedicated CC (CC-1) of the frequency band 2 to the dedicated CC radio unit a231 according to control from the control unit a25.

The TDD scheme-based signal processing unit a321 performs the same process as the baseband signal processing unit a22 for data received from a dedicated CC (CC-1). Here, the TDD scheme-based signal processing unit a321 maps data of each mobile station apparatus m2 according to a signal format of the TDD scheme. The TDD scheme-based signal processing unit a321 outputs control data to the control unit a15, and outputs user data to the IP communication unit a21.

The FDD scheme-based signal processing unit a322 performs the same process as the baseband signal processing unit a22 for data that is transmitted in common CCs (CC-2 to CC-4). Here, the FDD scheme-based signal processing unit a322 maps uplink data according to a signal format of the FDD scheme. The FDD scheme-based signal processing unit a322 outputs a signal arranged in a priority CC (CC-2) of the frequency band 1 to the priority CC radio unit a232 according to control from the control unit a25. In addition, the FDD scheme-based signal processing unit a322 outputs signals arranged in CC-3 of the frequency band 1 and CC-4 of the frequency band 3 to the priority CC radio unit a233 according to control from the control unit a25.

The FDD scheme-based signal processing unit a322 performs the same process as the baseband signal processing unit a22 according to data received from common CCs (CC-2 to CC-4). Here, the FDD scheme-based signal processing unit a322 de-maps data of each mobile station apparatus m2 according to a signal format of the FDD scheme. The FDD scheme-based signal processing unit a322 outputs control data to the control unit a15, and outputs user data to the IP communication unit a21.

<Configuration of Mobile Station Apparatus m2>

FIG. 14 is a schematic block diagram illustrating a configuration of the mobile station apparatus m2 according to this embodiment. The mobile station apparatus m2 according to this embodiment includes a baseband signal processing unit m23 as an example of details of the baseband signal processing unit m13 in FIG. 6. Because functions provided in other configurations (antennas m111 to m113, a radio unit m12, a baseband signal processing unit m13, an application processing unit m14, and a control unit m15) are the same as in the first embodiment (FIG. 6), description thereof is omitted.

The baseband signal processing unit m23 includes a TDD scheme-based signal processing unit m231 and an FDD scheme-based signal processing unit m232.

The TDD scheme-based signal processing unit m231 performs the same process as the baseband signal processing unit m13 for a signal input from the radio unit m122 for the frequency band 2, that is, a signal received from the frequency band 2 (a dedicated CC, CC-1). Here, the TDD scheme-based signal processing unit m231 de-maps, for example, data of each mobile station apparatus m2, according to a signal format of the TDD scheme. The TDD scheme-based signal processing unit m231 outputs control data to the control unit m15, and outputs user data to the application processing unit m14.

The TDD scheme-based signal processing unit m231 performs the same process as the baseband signal processing unit m13 for a signal that is transmitted in the frequency band 2 (a dedicated CC, CC-1). Here, the TDD scheme-based signal processing unit m231 maps, for example uplink data, according to a signal format of the TDD scheme. The TDD scheme-based signal processing unit m231 outputs a processed signal to the radio unit m122 for the frequency band 2.

The FDD scheme-based signal processing unit m232 performs the same process as the baseband signal processing unit m13 for signals input from the radio unit m121 for the frequency band 1 and the radio unit m123 for the frequency band 2, that is, signals received from the frequency bands 1 and 3 (common CCs). The FDD scheme-based signal processing unit m232 outputs control data to the control unit m15, and outputs user data to the application processing unit m14.

The FDD scheme-based signal processing unit m232 performs the same process as the baseband signal processing unit m13 for signals that are transmitted in the frequency bands 1 and 3 (common CCs). The FDD scheme-based signal processing unit m232 outputs a signal that is transmitted in the frequency band 1 among processed signals to the radio unit m121 for the frequency band 1, and outputs a signal that is transmitted in the frequency band 3 to the radio unit m123 for the frequency band 3.

The application processing unit m14 combines user data input from the TDD scheme-based signal processing unit m231 and the FDD scheme-based signal processing unit m232, and outputs the combined user data as audio or an image. In addition, the application processing unit m14 divides generated data, and outputs the divided data to one or both of the TDD scheme-based signal processing unit m231 and the FDD scheme-based signal processing unit m232.

Because an example of an operation of the wireless communication system according to this embodiment is the same as illustrated in FIGS. 8 to 11, description thereof is omitted.

As described above, in this embodiment, communication of the TDD scheme is performed in the femtocell-dedicated CC and communication of the FDD scheme is performed in the common CC. If the communication of the FDD scheme is performed in all frequency bands, the macro base station apparatus a1 should allocate a part of a frequency band dedicated to the femtocell so as to prevent signal interference. In this embodiment, because the communication of the TDD scheme is performed in the femtocell-dedicated CC, the macro base station apparatus a1 can perform communication in all frequency bands while reducing signal interference.

For example, the femtocell base station apparatus a3 and the mobile station apparatus m3 control interference, so that the macrocell base station apparatus a1 need not perform a special process for interference.

In addition, if the mobile station apparatus m3 can perform stable communication using a frequency band of the TDD scheme (the degradation of control information is very small because communication control data is communicated in the frequency band of the TDD scheme) and interference of the macrocell base station apparatus a3 is small, the mobile station apparatus m2 can further perform high-speed communication using an FDD frequency band serving as a common CC.

(Third Embodiment)

Hereinafter, the third embodiment of the present invention will be described in detail with reference to the drawings. In this embodiment, the mobile station apparatus communicates with the macrocell base station apparatus if radio quality of a common CC is low in communication with the femtocell base station apparatus. Here, the mobile station apparatus communicates with the femtocell base station apparatus using a dedicated CC. In addition, in this embodiment, the communication of the TDD scheme is performed in the femtocell-dedicated CC (dedicated frequency band), and the communication of the FDD scheme is performed in the common CC.

A schematic diagram illustrating a wireless communication system according to this embodiment is the same as in the second embodiment (FIG. 1). The schematic diagram illustrating an example of CC allocation according to this embodiment is the same as in the second embodiment (FIG. 12). Schematic block diagrams illustrating the configurations of the macrocell base station apparatus a1, the femtocell base station apparatus a3, and the mobile station apparatus m2 are the same as in the second embodiment (FIGS. 3, 13, and 14, respectively).

However, if radio quality information of a priority CC for a signal that is transmitted from the femtocell base station apparatus a3 (referred to as femto priority quality information) is less than a predetermined threshold value, the communication band selection units a256 of the femtocell base station apparatus a3 determine whether the radio quality information of a priority CC for a signal that is transmitted from the macrocell base station apparatus a1 (referred to as macro priority radio quality information) is less or greater than the predetermined threshold value. Here, for example, reference signal receive power (RSRP) measured by the mobile station apparatus m2 is used as the radio quality information.

When determining that the macro priority radio quality information is less than the predetermined threshold value (the radio quality of the macrocell is low), the communication band selection unit a256 selects the macrocell-dedicated CC as a communication CC. On the other hand, when determining that the macro priority radio quality information is greater than the predetermined threshold value (the radio quality of the macrocell is high), the communication band selection unit a256 selects the femtocell-dedicated CC as a communication CC in which the mobile station apparatus m2 communicates with the femtocell base station apparatus a3. In addition, the communication band selection unit a256 selects all or some of CCs (CC-2 to CC-6) in which the macrocell base station apparatus a1 can perform communication as communication CCs in which the mobile station apparatus m2 and the macrocell base station apparatus a1 perform communication.

If the femtocell base station apparatus a3 and the mobile station apparatus m2 perform communication using a dedicated CC and simultaneously the macrocell base station apparatus a1 and the mobile station apparatus perform communication, the control unit a25 of the femtocell base station apparatus a3 controls data using the networks N1 and N2. Specifically, data of a signal received by the macrocell base station apparatus a1 is transmitted to the CN N1 via the CN communication unit a11. The IP communication unit a21 of the femtocell base station apparatus a3 receives the data via the IP network N2, and outputs the received data to the control unit a25. On the other hand, the control unit a25 combines data input from the TDD scheme-based signal processing unit a321 with data input from the IP communication unit a21, and processes the combined data as reception data from the mobile station apparatus m2.

In addition, the control unit a25 divides data that is transmitted to the mobile station apparatus m2 into data that is transmitted from the femtocell base station apparatus a3 using the dedicated CC and data that is transmitted from the macrocell base station apparatus a1. The control unit a25 outputs data that is transmitted from the femtocell base station apparatus a3 to the TDD scheme-based signal processing unit a321 using the dedicated CC. The control unit a25 outputs data that is transmitted from the macrocell base station apparatus a1 to the IP communication unit a21. The IP communication unit a2 transmits the data to the CN N1 via the IP network N2, and the CN communication unit a11 of the macrocell base station apparatus a1 receives the data. The CN communication unit a11 outputs the received data to the baseband signal processing unit a12, and the macrocell base station apparatus a1 performs transmission to the mobile station apparatus m2 using one or both of the radio unit a131 for the frequency band 1 and the radio unit a133 for the frequency band 3.

FIG. 15 is a sequence diagram illustrating an example of an operation of a wireless communication system according to the third embodiment of the present invention. Because the process of steps S101 to S114, S141 to S144, and S115 to S117 in FIG. 15 is the same as in FIG. 15, description thereof is omitted.

(Step S251) The femtocell base station apparatus a3 determines whether the femto priority radio quality information transmitted from the mobile station apparatus m2 is less or greater than a predetermined threshold value. In the example of FIG. 11, the femtocell base station apparatus a3 determines that the femto priority radio quality information is greater than the predetermined threshold value, and the mobile station apparatus m2 transmits/receives a communication packet by directly communicating with the femtocell base station apparatus a3 using CC-1 to CC-4. Thereafter, the process proceeds to step S252.

(Step S252) The mobile station apparatus m2 measures radio quality of a priority CC for each of signals transmitted from the macrocell base station apparatus a1 and the femtocell base station apparatus a3, and transmits radio quality information (macro priority radio quality information and femto priority radio quality information) to the femtocell base station apparatus a3 as the measurement result. Thereafter, the process proceeds to step S253.

(Step S253) The femtocell base station apparatus a3 determines whether the femto priority radio quality information transmitted from the mobile station apparatus m2 is less or greater than the predetermined threshold value. In the example of FIG. 11, the femtocell base station apparatus a3 determines that the femto priority radio quality information is less than the predetermined threshold value, and determines whether the macro priority radio quality information is less or greater than the predetermined threshold value. In the example of FIG. 11, the femtocell base station apparatus a3 (the communication band selection unit a256) determines that the macro priority radio quality information is greater than the predetermined threshold value. In this case, the femtocell base station apparatus a3 determines a femtocell-dedicated CC as a communication CC in which the mobile station apparatus m2 and the femtocell base station apparatus a3 perform communication. In addition, the femtocell base station apparatus a3 determines a CC in which the macrocell base station apparatus a1 can perform communication as a communication CC in which the mobile station apparatus m2 and the macrocell base station apparatus a1 perform communication. Thereafter, the process proceeds to step S254.

The femtocell base station apparatus a3 may set communication CCs to be used for wireless communication by the mobile station apparatus m2 and the macrocell base station apparatus a1 to some of CC-2 to CC-6 on the basis of radio quality information of each CC and an amount of user data.

(Step S254) The mobile station apparatus m2 transmits/receives communication packets by communicating with the femtocell base station apparatus a3 using CC-1 and communicating with the macrocell base station apparatus a1 using CC-2 to CC-6. Thereafter, the process proceeds to step S261.

(Step S261) The femtocell base station apparatus a3 determines whether the femto priority radio quality information transmitted from the mobile station apparatus m2 is less or greater than the predetermined threshold value. In the example of FIG. 11, the femtocell base station apparatus a3 determines that radio quality information is less than the predetermined threshold value, and transmits/receives communication packets by directly communicating with the femtocell base station apparatus a3 and the macrocell base station apparatus a1 using CC-1 to CC-6. Thereafter, the process proceeds to step S252.

(Step S262) The mobile station apparatus m2 measures radio quality of a priority CC for each of signals transmitted from the macrocell base station apparatus a1 and the femtocell base station apparatus a3, and transmits radio quality information (macro priority radio quality information and femto priority radio quality information) to the femtocell base station apparatus a3 as the measurement result. Thereafter, the process proceeds to step S263.

(Step S263) The femtocell base station apparatus a3 determines whether the femto priority radio quality information transmitted from the mobile station apparatus m2 is less or greater than the predetermined threshold value. In the example of FIG. 11, the femtocell base station apparatus a3 determines that the femto priority radio quality information is greater than the predetermined threshold value. In this case, the femtocell base station apparatus a3 determines a dedicated CC and a common CC (CC-1 to CC-4) as communication CCs in which the mobile station apparatus m2 and the femtocell base station apparatus a3 perform communication. Thereafter, the process proceeds to step S264.

(Step S264) The mobile station apparatus m2 transmits/receives a communication packet by communicating with the femtocell base station apparatus a3 using CC-1 to CC-4. Thereafter, the process proceeds to step S115.

As described above, in this embodiment, CA is performed using the macrocell base station apparatus a1 if interference of communication with the femtocell base station apparatus a3 is large (radio quality is low). For example, the mobile station apparatus m3 performs CA with only the femtocell base station apparatus a3 using a dedicated CC and a common CC in the vicinity of the femtocell base station apparatus a3 used in an indoor space. If a radio wave from the macrocell base station apparatus a1 is received at a very high level at the window distant from the femtocell base station apparatus a3, the mobile station apparatus m3 performs CA with the femtocell base station apparatus a1 using a dedicated CC and the macrocell base station apparatus a3 using a CC used by the macrocell base station apparatus a3.

Thereby, the macrocell base station apparatus a1 can reduce communication load according to the femtocell base station apparatus a3. In addition, if common CCs are available to the femtocell base station apparatus a3, the mobile station apparatus m2 can use communication at a low cost using the common CCs. In addition, the mobile station apparatus m2 can perform high-speed data communication using CA if interference from the macrocell base station apparatus a1 is large at the window or the like.

In the above-described third embodiment, the femtocell base station apparatus a3 may make a determination so that communication with the femtocell base station apparatus a1 using a dedicated CC and the macrocell base station apparatus a3 using a CC used by the macrocell base station apparatus a3 is performed if a value obtained by subtracting the femto priority radio quality information from the macro priority radio quality information is greater than a predetermined value.

In the above-described embodiments, the mobile station apparatus m1 and m4 periodically measure radio quality of a priority CC or the like, and transmit radio quality information to the femtocell base station apparatus a2 and a3 as the measurement result if the measured radio quality exceeds a predetermined threshold value.

In addition, although the case in which four CCs are used for communication in the femtocell in the above-described embodiments has been described, the present invention is not limited thereto. More CCs may be provided. For example, the number of CCs may be five or more. In addition, although the case in which the number of femtocell-dedicated CCs is one has been described in the above-described embodiments, the present invention is not limited thereto. A plurality of femtocell-dedicated CCs may be provided. In this case, communication of CA technology may be performed using the plurality of femtocell-dedicated CCs. In addition, a plurality of priority CCs may be provided.

In addition, if the mobile station apparatus m1 communicates with the femtocell base station apparatus a2 when radio quality of the common CC is high, the femtocell base station apparatus a2 also selects the femtocell-dedicated CC as a communication CC. However, the present invention is not limited thereto. At this time, the femtocell-dedicated CC may not be selected as the communication CC.

In addition, it is preferable that the femtocell-dedicated CC be a CC unavailable to communication of CA technology.

In the above-described embodiment, the case in which the macrocell base station apparatus a1 and both the femtocell base station apparatus a2 and a3 perform communication of CA technology has been described. However, the present invention is not limited thereto, and the macrocell base station apparatus a1 may not perform communication of CA technology.

In addition, in the above-described embodiments, the macrocell base station apparatus a1 and the femtocell base station apparatus a2 and a3 may be reversed.

In addition, in the above-described embodiments, the femtocell base station apparatus a2 and a3 (the radio control unit a258) and the mobile station apparatus m1 and m4 (the radio control unit m158) may transmit a signal of control data including system information such as mapping information using only a femtocell-dedicated cell. Thereby, it is possible to prevent the signal of control data from interfering with a signal of a macrocell and reliably transmit and receive the control data.

In addition, although the case in which the mobile station apparatus m1 and m4 include the radio control unit m158 in the above-described embodiments has been described, the present invention is not limited thereto. The femtocell base station apparatus a2 and a3 may have a function provided in the radio control unit m158. In this case, the radio control unit m158 provided in the femtocell base station apparatus a2 and a3 determines a CC (a priority CC or a femtocell-dedicated CC) to be used for communication, and transmits information indicating the determined CC to the mobile station apparatus m1 and m4. The mobile station apparatus m1 and m4 perform communication using a CC indicated by the received information.

In the above-described third embodiment, communication of the FDD scheme and communication of the TDD scheme may be performed in the femtocell-dedicated CC and the common CC.

Some parts of the femtocell base station apparatus a2 and the mobile station apparatus m1 according to the above-described embodiment, for example, the dedicated CC radio unit a231 the priority CC radio unit a232, the common CC radio unit a233, the authentication unit a251, the frequency band information providing unit a254, the radio quality information acquisition unit a255, the communication band selection unit a256, the radio control unit a258, the radio unit m121 for the frequency band 1, the radio unit m122 for the frequency band 2, the radio unit m123 for the frequency band 3, the frequency band information acquisition unit m151, the radio quality measurement unit m153, the connection base station selection unit m154, the radio quality providing unit m155, the communication band information acquisition unit m156, and the radio control unit m158, may be implemented by a computer. In this case, the control function may be implemented by recording a program for implementing the control function on a computer-readable recording medium and causing a computer system to read and execute the program recorded on the recording medium. The term "computer system" as used herein refers to a computer system embedded in the femtocell base station apparatus a2 or the mobile station apparatus m1, and encompasses an operating system (OS) and/or hardware such as peripheral devices. In addition, the "computer-readable recording medium" refers to a storage apparatus including a flexible disk, a magneto-optical disc, a read only memory (ROM), a portable medium such as a compact disc-ROM (CD-ROM), and a hard disk embedded in the computer system. Further, the term "computer-readable recording medium" may encompass a medium that dynamically holds a program for a short period of time as in communication lines in the case in which a program is transmitted over a network such as the Internet or communication lines such as phone lines as well as a medium that holds a program for a given period of time such as a volatile memory within a computer system that serves as a server or a client in such a case. In addition, the above-described program may be a program for implementing some of the functions described above or a program capable of implementing the functions described above in combination with a program(s) already recorded on the computer system.

Although the embodiments of the present invention have been described above with reference to the drawings, specific configurations are not limited to these embodiments, and designs can also be made without departing from the scope of the present invention.

Reference Symbols
 A11, a1: Macrocell base station apparatus
 A21, A22, a2, a3: Femtocell base station apparatus
 M10 to M12, m1, m4: Mobile station apparatus
 a11: CN communication unit
 a12: Baseband signal processing unit
 a13: Radio unit
 a141 to a143: Antenna
 a15: Control unit
 a131: Radio unit for frequency band 1
 a132: Radio unit for frequency band 2
 a133: Radio unit for frequency band 3
 a21: IP communication unit
 a22, a32: Baseband signal processing unit a23: Radio unit
a241 to a243: Antenna
a25: Control unit
a231: Dedicated CC radio unit
a232: Priority CC radio unit
a233: Common CC radio unit
a251: Authentication unit
a252: Connection apparatus storage unit
a253: Frequency band information storage unit
a254: Frequency band information providing unit
a255: Radio quality information acquisition unit
a256: Communication band selection unit
a257: Communication band information storage unit
a258: Radio control unit (base station radio control unit)
m111 to m113: Antenna
m12: Radio unit
m13, m23: Baseband signal processing unit
m14: Application processing unit
m15: Control unit
m121: Radio unit for frequency band 1
m122: Radio unit for frequency band 2
m123: Radio unit for frequency band 3
m151: Frequency band information acquisition unit
m152: Frequency band information storage unit
m153: Radio quality measurement unit
m154: Connection base station selection unit
m155: Radio quality providing unit
m156: Communication band information acquisition unit
m157: Communication band information storage unit
m158: Radio control unit (mobile station radio control unit)
a321: TDD scheme-based signal processing unit
a322: FDD scheme-based signal processing unit

The invention claimed is:

1. A wireless communication system comprising:
a first base station apparatus;
a second base station apparatus; and
a mobile station apparatus configured to communicate with the first and second base station apparatuses, wherein
the first base station apparatus is configured to communicate with the mobile station apparatus,
the second base station apparatus is configured to communicate with the mobile station apparatus using at least one of common frequency bands and at least one dedicated frequency bands, the at least one of the common frequency bands being used by the first and second base station apparatuses, the at least one of the dedicated frequency bands being unused by the first base station apparatus,
the second base station apparatus comprises a communication band selection unit configured to select all of a plurality of common frequency bands in case that a radio quality of a part of the plurality of common frequency bands in the mobile station apparatus is greater than a predetermined threshold value, and select the at least one of the dedicated frequency bands in case that the radio quality is less than the predetermined threshold value,
at least one of the mobile station apparatus and the second base station apparatus comprises a mobile station radio control unit configured to control a communication between the mobile station apparatus and the second base station apparatus so as to use the all of the plurality of the common frequency bands, the communication using a carrier aggregation technology, the communication being performed in case that the radio quality is greater than the predetermined threshold value, and control the communication so as to use the at least one of the dedicated frequency bands, the communication being performed in case that the radio quality is less than the predetermined threshold value.

2. The wireless communication system according to claim 1, wherein
the mobile station apparatus comprises a connection base station selection unit configured to establish a connection to the second base station apparatus using the at least one of the dedicated frequency bands in case that a signal has been detected in the at least one of the dedicated frequency bands in case that no connection to the second base station apparatus has been established.

3. The wireless communication system according to claim 1, wherein
the mobile station radio control unit is configured to control at least one of a transmission and a reception of control information for controlling the communication using the at least one of the dedicated frequency bands.

4. The wireless communication system according to claim 1, wherein:
the communication band selection unit is configured to select a part of the plurality of the common frequency bands as an incoming call monitoring frequency band in which the mobile station apparatus monitors incoming call notification in case that the radio quality is greater than the predetermined threshold value, and select the at least one of the dedicated frequency bands as the incoming call monitoring frequency band in which the mobile station apparatus monitors the incoming call notification in case that the radio quality is less than the predetermined threshold value, and
the mobile station radio control unit is configured to control monitoring of the incoming call notification in the part of the plurality of the common frequency bands in case that the radio quality is greater than the predetermined threshold value and monitoring of the incoming call notification in the at least one of the dedicated frequency bands in case that the radio quality is less than the predetermined threshold value.

5. The wireless communication system according to claim 4, wherein:
the part of the plurality of the common frequency bands is a predetermined quality measurement frequency band, and
the radio quality is radio quality of a quality measurement frequency band.

6. The wireless communication system according to claim 5, wherein:
the mobile station apparatus comprises a connection base station selection unit configured to establish a connection to the second base station apparatus using the at least one of the dedicated frequency bands in case that a signal has been detected in the at least one of the dedicated frequency bands in case that no connection to the second base station apparatus has been established, and
the second base station apparatus comprises a base station radio control configured to control stopping of a signal which is transmitted in the at least one of the common frequency bands in case that all of mobile station apparatuses are not connected.

7. The wireless communication system according to claim 5, wherein:
the base station radio control unit is configured to control stopping of a signal which is transmitted in the at least one of the common frequency bands other than the quality measurement frequency band in case that the communication band selection unit selects only the at least one of the dedicated frequency bands as a frequency band to be used for the communication.

8. The wireless communication system according to claim 1, wherein
the first base station apparatus is configured to perform communication in a wider range than the second base station apparatus.

9. The wireless communication system according to claim 1, wherein
a time division duplex scheme is used in the communication using the at least one of the dedicated frequency bands.

10. A second base station apparatus comprising:
a communication unit configured to communicate with a mobile station apparatus using at least one of command frequency bands and at least one of dedicated frequency bands, the at least one of the common frequency bands being used by a first base station apparatus and the second base station apparatus, the at least one of the dedicated frequency bands being unused by the first base station apparatus,
a radio quality information acquisition unit configured to acquire a radio quality of a part of the plurality of the common frequency bands in the mobile station apparatus; and
a communication band selection unit configured to select all of a plurality of common frequency bands in case that the radio quality measured by the radio quality information acquisition unit is greater than a predetermined threshold value, and select the at least one of the dedicated frequency bands in case that the radio quality measured by the radio quality information acquisition unit is less than the predetermined threshold value.

11. The second base station apparatus according to claim 10, wherein
control information which controls the communication is transmitted or received using the at least one of the dedicated frequency bands in the communication with the mobile station apparatus.

12. The second base station apparatus according to claim 10, wherein
a signal which is transmitted in the at least one of common frequency bands is stopped in case that all of mobile station apparatuses are not connected.

13. The second base station apparatus according to claim 10, wherein
the communication is stopped in the at least one of the common frequency bands other than a quality measurement frequency band to be used for measurement of the radio quality of the at least one of the common frequency bands, the at least one of the common frequency bands being a part of the plurality of the common frequency bands, in case that communication with the mobile station apparatus is performed in only the at least one of the dedicated frequency bands.

14. The second base station apparatus according to claim 10, wherein
a time division duplex scheme is used in the communication using the at least one of the dedicated frequency bands.

15. A mobile station apparatus comprising:
a communication unit configured to communicate with a second base station apparatus using at least one of common frequency bands and at least one of dedicated frequency bands, the at least one of the common frequency bands being used by a first base station apparatus and the second base station apparatus, the at least one of the dedicated frequency bands being unused by the first base station apparatus,
a radio control unit configured to control a communication between the mobile station apparatus and the second base station apparatus so as to use all of a plurality of the common frequency bands, the communication using a carrier aggregation technology, the communication being performed in case that a radio quality of a part of the plurality of the common frequency bands in the mobile station apparatus is greater than the predetermined threshold value, and control the communication so as to use the at least one of the dedicated frequency bands, the communication being performed in case that the radio quality is less than the predetermined threshold value.

16. The mobile station apparatus according to claim 15, wherein
in case that a connection to the second base station apparatus is established, the connection is performed using the at least one of the dedicated frequency bands.

17. The mobile station apparatus according to claim 15, wherein
control information for controlling the communication is transmitted or received using the at least one of the dedicated frequency bands in the communication with the second base station apparatus.

18. The mobile station apparatus according to claim 15, wherein,
in case that the communication with the second base station apparatus is performed in only the at least one of the dedicated frequency bands, the radio quality of a quality measurement frequency band, which is a part of the at least one of the common frequency bands, is measured as radio quality of the at least one of the common frequency bands.

19. The mobile station apparatus according to claim 15, wherein
a time division duplex scheme is used in the communication using the at least one of the dedicated frequency bands.

20. The mobile station apparatus according to claim 15, wherein
the communication with the first base station apparatus is controlled based on radio quality of the at least one of the common frequency bands of the first base station apparatus and the mobile station apparatus.

21. A communication control method performed by a second base station apparatus, the communication control method comprising:
communicating with a mobile station apparatus using at least one of common frequency bands and at least one of dedicated frequency bands, the at least one of the common frequency bands being used by a first base station apparatus and the second base station apparatus, the at least one of the dedicated frequency bands being unused by the first base station apparatus;
acquiring a radio quality of a part of the plurality of the common frequency bands in the mobile station apparatus; and
selecting all of a plurality of common frequency bands in case that the measured radio quality measured is greater than a predetermined threshold value, and selecting the at least one of the dedicated frequency bands in case that the measured radio quality is less than the predetermined threshold value.

22. A communication control method performed by a mobile station apparatus, the communication control method comprising:
  communicating with a second base station apparatus using at least one of common frequency bands and at least one of dedicated frequency bands, the at least one of the common frequency bands being used by a first base station apparatus and the second base station apparatus, the at least one of the dedicated frequency bands being unused by the first base station apparatus; and
  controlling a communication between the mobile station apparatus and the second base station apparatus so as to use all of a plurality of the common frequency bands, the communication using a carrier aggregation technology, the communication being performed in case that a radio quality of a part of the plurality of the common frequency bands in the mobile station apparatus is greater than the predetermined threshold value, and controlling the communication so as to use the at least one of the dedicated frequency bands, the communication being performed in case that the radio quality is less than the predetermined threshold value.

23. A non-transitory computer-readable recording medium storing a communication control program, the communication control program make a computer of a second base station apparatus perform:
  communicating with a mobile station apparatus using at least one of common frequency bands and at least one of dedicated frequency bands, the at least one of the common frequency bands being used by a first base station apparatus and the second base station apparatus, the at least one of the dedicated frequency bands being unused by the first base station apparatus;
  acquiring a radio quality of a part of the plurality of the common frequency bands in the mobile station apparatus; and
  selecting all of a plurality of common frequency bands in case that the measured radio quality measured is greater than a predetermined threshold value, and selecting the at least one of the dedicated frequency bands in case that the measured radio quality is less than the predetermined threshold value.

24. A non-transitory computer-readable recording medium storing a communication control program, the communication control program make a computer of a mobile station apparatus perform:
  communicating with a second base station apparatus using at least one of common frequency bands and at least one of dedicated frequency bands, the at least one of the common frequency bands being used by a first base station apparatus and the second base station apparatus, the at least one of the dedicated frequency bands being unused by the first base station apparatus; and
  controlling a communication between the mobile station apparatus and the second base station apparatus so as to use all of a plurality of the common frequency bands, the communication using a carrier aggregation technology, the communication being performed in case that a radio quality of a part of the plurality of the common frequency bands in the mobile station apparatus is greater than the predetermined threshold value, and controlling the communication so as to use the at least one of the dedicated frequency bands, the communication being performed in case that the radio quality is less than the predetermined threshold value.

* * * * *